(12) United States Patent
Frost et al.

(10) Patent No.: US 10,298,859 B2
(45) Date of Patent: May 21, 2019

(54) ENHANCED VISUAL REPRESENTATION OF INFRARED DATA VALUES

(71) Applicant: FLIR Systems AB, Taby (SE)

(72) Inventors: Walter Frost, Stockholm (SE); Mikael Erlandsson, Uppsala (SE); Fredrik Von Braun, Stockholm (SE); Petter Wilhelm Richard Sundin, Skärholmen (SE)

(73) Assignee: FLIR Systems AB, Taby (SE)

( * ) Notice: Subject to any disclaimer, the term of this patent is extended or adjusted under 35 U.S.C. 154(b) by 546 days.

(21) Appl. No.: 14/531,955

(22) Filed: Nov. 3, 2014

(65) Prior Publication Data

US 2015/0124102 A1     May 7, 2015

Related U.S. Application Data

(60) Provisional application No. 61/898,621, filed on Nov. 1, 2013.

(51) Int. Cl.
| | | |
|---|---|---|
| *H04N 5/33* | (2006.01) | |
| *H04N 1/46* | (2006.01) | |
| *H04N 9/43* | (2006.01) | |
| *H04N 9/64* | (2006.01) | |

(52) U.S. Cl.
CPC ............... *H04N 5/33* (2013.01); *H04N 1/465* (2013.01); *H04N 9/43* (2013.01); *H04N 9/64* (2013.01)

(58) Field of Classification Search
CPC ............ H04N 5/33; H04N 1/465; H04N 9/43; H04N 9/64
See application file for complete search history.

(56) References Cited

U.S. PATENT DOCUMENTS

| | | | |
|---|---|---|---|
| 2008/0204579 A1* | 8/2008 | Masuda | G06T 5/003 348/254 |
| 2009/0008558 A1 | 1/2009 | Strandemar et al. | |
| 2009/0121135 A1* | 5/2009 | Warner | G02B 23/125 250/330 |
| 2012/0098971 A1* | 4/2012 | Hansen | H04N 5/2258 348/164 |
| 2012/0314066 A1* | 12/2012 | Lee | G08B 17/125 348/143 |
| 2013/0258111 A1* | 10/2013 | Frank | H04N 5/33 348/164 |
| 2013/0314221 A1* | 11/2013 | Taylor | G06T 7/174 340/435 |
| 2015/0103862 A1* | 4/2015 | Wei | G01J 5/0896 374/121 |

FOREIGN PATENT DOCUMENTS

WO   WO 2006/060746   6/2006

* cited by examiner

*Primary Examiner* — Tat C Chio
(74) *Attorney, Agent, or Firm* — Haynes and Boone LLP

(57) ABSTRACT

Various techniques are provided to generate enhanced visual representations of captured infrared (IR) data values. For example, various methods, systems, devices, and machine-readable mediums are provided that may be used to map color and/or grayscale values to temperature values. Such mapping permits a user to intuitively interpret the temperatures associated with the IR data values. The temperatures may be presented as a visual representation of the captured IR data values having an enhanced contrast.

20 Claims, 13 Drawing Sheets
(8 of 13 Drawing Sheet(s) Filed in Color)

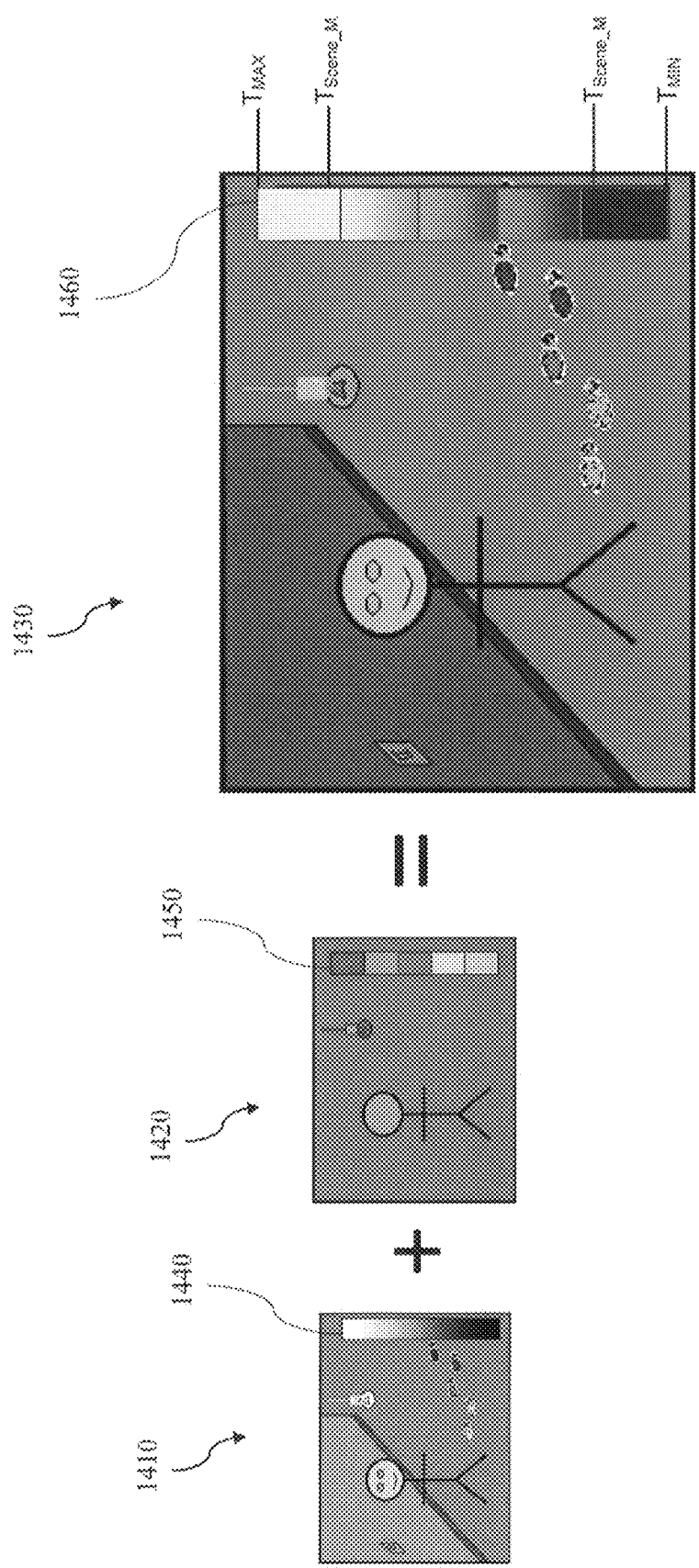

ENHANCED VISUAL REPRESENTATION OF INFRARED DATA VALUES

CROSS-REFERENCE TO RELATED APPLICATION

This application claims the benefit of U.S. Provisional Patent Application No. 61/898,621 filed Nov. 1, 2013 and entitled "ENHANCED VISUAL REPRESENTATION OF INFRARED DATA VALUES", which is incorporated herein by reference in its entirety.

TECHNICAL FIELD

Generally, embodiments of the invention relate to the technical field of displaying captured infrared (IR) data values, representing IR radiation emitted from an observed real world scene, on a display device. More specifically, various embodiments relate to enhanced display and interpretation of IR images and, in particular, enhanced with regard to contrast.

BACKGROUND

Thermal, or infrared (IR), images of scenes are often useful for monitoring, inspection, and/or maintenance purposes. Typically, a thermal imaging device, e.g., in the form of a thermography arrangement or a thermal imaging device, is provided to receive or capture IR information, or data values, and create, or generate, a visual representation of the captured IR information, typically in the form of an IR image, representing IR radiation emitted from an observed real world scene. Optionally, visible light (VL) data values (e.g., also referred to as visual light data values), representing VL emitted or reflected from the observed real world scene, is captured substantially simultaneously with the IR image.

The generated visual representation, commonly referred to as an IR image, may further, after capturing, be displayed using a display device, either in a thermal imaging device or in a computing device, such as a tablet computer, a laptop, or a desktop computer. The generated IR image may, after capturing, be stored in either a thermal imaging device, an external memory, or a computing device, and subjected to subsequent analysis in order to, for example, analyze temperature deviation of objects in an observed real world scene based on temperature deviations in successive IR images, i.e., multiple IR images captured sequentially in time.

As IR radiation is not visible to the human eye, there is no natural relation between the captured IR data values and color or grayscale (also referred to as grey scale) values. Therefore an information visualization process referred to as false color or pseudo color is used to map captured IR data values of each pixel in an IR image to colors displayed on a display device.

The mapping of captured IR data values of each pixel in an IR image to colors displayed on a display device is typically based on a predetermined palette of grayscale and/or color values on the one hand and temperature values associated with the captured IR data values on the other hand.

Both new and experienced thermal imaging device users may have difficulties interpreting the observed real world scene based on the color and/or grayscale values assigned to it in the visual representation, which is typically presented to the user on a display device connected or communicatively coupled to the thermal imaging device, or a display device configured to accept and display a stored visual representation at a later time. For inexperienced IR imaging users it becomes crucial that cameras for such target groups support a "walk-up-and-use" behavior.

Thus, for conventional systems today, analysis based on IR images is typically performed by an analyst who often is a high skilled engineer and researcher. There is, therefore, a need for a system that provides increased accuracy, further consistent data display, and other improvements while reducing complexity and increasing the intuitive interpretability in order to enhance the user experience with regard to viewing and analyzing a visual representation of IR data values.

SUMMARY

Methods, thermal imaging devices, systems, and machine-readable mediums (on which are stored non-transitory information) according to embodiments presented herein provide a mapping of color and/or grayscale values to temperature values, which enables an intuitive interpretation of the temperatures associated with captured infrared (IR) data values. The temperatures may according to embodiments be presented as a visual representation of the captured IR data values, commonly referred to as IR images, having an enhanced contrast.

According to the different embodiments described herein, generation and display of enhanced IR images is obtained, in particular with regard to visible contrast or difference between parts of the image showing different levels or ranges associated with the captured IR data values. Thereby, an easily interpretable visualization of an IR image, according to settings that may in some embodiments be chosen by the user, is provided.

The method according to the inventive embodiments enhances the user experience since the user's ability to view, interpret and analyze a generated IR image is improved.

In some embodiments, IR images are generated having high contrast while at the same time having a maintained mapping between temperature and color and/or grayscale values according to a selected or predetermined palette. For instance, this may be obtained by embodiments involving pseudo colorization of the pixels of a frame of IR data values using semitransparent colors and/or grayscale values according to the selected or predetermined palette that defines a fixed mapping between temperature and color and/or grayscale values. Fixed mapping of colors or grayscale values to specific temperatures or temperature intervals (e.g., temperate ranges or temperature spans) may also be referred to as isotherm mapping. Thereby, an IR image having the colors of a specified palette and contrast information from underlying grayscale information is obtained.

In some embodiments, a thermal imaging system is provided for generating an enhanced visual representation of IR data values based on a captured frame of IR data values captured using a detector having a number of detector elements, the captured frame of IR data values comprising, for each detector element, an IR pixel being assigned an IR data value representing a temperature value associated with the IR radiation emitted from an observed real world scene and received by said detector element, the thermal imaging system comprising at least one memory configured to store data values or parameters received from a processor or to retrieve and send data values or parameters to a processor and a processor configured to: receive a control signal; the processor further being configured to: select a palette, from a predefined list of palettes, based on said received control signal, wherein said selected palette represents a predetermined relation between a predefined number of temperature ranges and multiple representation values in a color model; and generate a visual representation of said IR data values by: mapping a color or grayscale value comprised in said selected palette to each pixel of said frame of IR data values based on the predetermined relation between the color or grayscale value and the temperature value associated with said pixel of said frame of IR data values; and assigning each pixel of said frame of IR data values a representation value from said color model dependent on said mapping.

In some embodiments, a method is provided for generating an enhanced visual representation of IR data values based on a captured frame of IR data values captured using a detector having a number of detector elements, the captured frame of IR data values comprising, for each detector element, an IR pixel being assigned an IR data value representing a temperature value associated with the IR radiation emitted from an observed real world scene and received by said detector element, the method comprising: receiving a control signal; selecting a palette, from a predefined list of palettes, based on said received control signal, wherein said selected palette represents a predetermined relation between a predefined number of temperature ranges and multiple representation values in a color model; generating a visual representation of said IR data values by: mapping a color or grayscale value comprised in said selected palette to each pixel of said frame of IR data values based on the predetermined relation between the color or grayscale value and the temperature value associated with said pixel of said frame of IR data values; and assigning each pixel of said frame of IR data values a representation value from said color model dependent on said mapping.

In some embodiments, a method includes receiving a frame of infrared (IR) data values captured by a detector comprising a plurality of detector elements, wherein the frame comprises, for each detector element, a pixel having an assigned one of the IR data values representing a temperature value associated with infrared radiation emitted from an observed real world scene and received by the detector element; receiving a control signal; selecting a palette from a predefined set of palettes based on the received control signal, wherein the selected palette represents predetermined relations between a predefined number of temperature ranges and multiple representation values in a color model; and generating a visual representation of at least a portion of the IR data values assigned to a corresponding set of the pixels by: mapping a color or grayscale value of the selected palette to each pixel of the set based on the predetermined relation between the color or grayscale value and the temperature value associated with the IR data value of the pixel, and assigning each pixel of the set a representation value from the color model dependent on the mapping.

In some embodiments, a system comprises a processor; and a memory configured to store a plurality of computer-readable instructions which when executed by the processor are configured to cause the system to perform a method comprising: receiving a frame of infrared (IR) data values captured by a detector comprising a plurality of detector elements, wherein the frame comprises, for each detector element, a pixel having an assigned one of the IR data values representing a temperature value associated with infrared radiation emitted from an observed real world scene and received by the detector element, receiving a control signal, selecting a palette from a predefined set of palettes based on the received control signal, wherein the selected palette represents predetermined relations between a predefined number of temperature ranges and multiple representation values in a color model, and generating a visual representation of at least a portion of the IR data values assigned to a corresponding set of the pixels by: mapping a color or grayscale value of the selected palette to each pixel of the set based on the predetermined relation between the color or grayscale value and the temperature value associated with the IR data value of the pixel, and assigning each pixel of the set a representation value from the color model dependent on the mapping.

In some embodiments, a machine-readable medium stores non-transitory information comprising a plurality of machine-readable instructions which when executed by one or more processors of a system are configured to cause the system to perform a method comprising: receiving a frame of infrared (IR) data values captured by a detector comprising a plurality of detector elements, wherein the frame comprises, for each detector element, a pixel having an assigned one of the IR data values representing a temperature value associated with infrared radiation emitted from an observed real world scene and received by the detector element; receiving a control signal; selecting a palette from a predefined set of palettes based on the received control signal, wherein the selected palette represents predetermined relations between a predefined number of temperature ranges and multiple representation values in a color model; and generating a visual representation of at least a portion of the IR data values assigned to a corresponding set of the pixels by: mapping a color or grayscale value of the selected palette to each pixel of the set based on the predetermined relation between the color or grayscale value and the temperature value associated with the IR data value of the pixel, and assigning each pixel of the set a representation value from the color model dependent on the mapping.

In some embodiments, a method is provided for receiving a frame of infrared (IR) data values captured by a detector comprising a plurality of detector elements, wherein the frame comprises, for each detector element, a pixel having an assigned one of the IR data values representing a temperature value associated with infrared radiation emitted from an observed real world scene and received by the detector element; generating a visual representation of at least a portion of the IR data values assigned to a corresponding set of the pixels by, for each pixel: mapping, for a first set of pixel value components, a color value of a palette based on a predetermined fixed relation between the color value and the temperature value associated with the IR data value of the pixel; and assigning, to said first set of pixel value component, a representation value from the color model dependent on the mapping.

In some embodiments, a system comprises a processor; and a memory configured to store a plurality of computer readable instructions which when executed by the processor are configured to cause the system to perform a method comprising: receiving a frame of infrared (IR) data values captured by a detector comprising a plurality of detector elements, wherein the frame comprises, for each detector element, a pixel having an assigned one of the IR data values representing a temperature value associated with infrared radiation emitted from an observed real world scene and received by the detector element; generating a visual representation of at least a portion of the IR data values assigned to a corresponding set of the pixels by, for each pixel: mapping, for a first set of pixel value components, a color value of a palette based on a predetermined fixed relation between the color value and the temperature value associated with the IR data value of the pixel; and assigning, to said first set of pixel value component, a representation value from the color model dependent on the mapping.

In some embodiments, a machine-readable medium stores non-transitory information comprising a plurality of machine-readable instructions which when executed by one or more processors of a system are configured to cause the system to perform a method comprising: receiving a frame of infrared (IR) data values captured by a detector comprising a plurality of detector elements, wherein the frame comprises, for each detector element, a pixel having an assigned one of the IR data values representing a temperature value associated with infrared radiation emitted from an observed real world scene and received by the detector element; generating a visual representation of at least a portion of the IR data values assigned to a corresponding set of the pixels by, for each pixel: mapping, for a first set of pixel value components, a color value of a palette based on a predetermined fixed relation between the color value and the temperature value associated with the IR data value of the pixel; and assigning, to said first set of pixel value component, a representation value from the color model dependent on the mapping.

In some embodiments, a method includes: receiving a frame of infrared (IR) data values captured by a detector comprising a plurality of detector elements, wherein the frame comprises, for each detector element, a pixel having an assigned one of the IR data values representing a temperature value associated with infrared radiation emitted from an observed real world scene and received by the detector element; and generating a visual representation of at least a portion of the IR data values assigned to a corresponding set of the pixels, wherein the visual representation comprises, for each pixel, at least one color-representing component and a grayscale component according to a color model. The generating of the visual representation involves: assigning, for each pixel, a value to the at least one color-representing component based on the IR data value of the pixel and according to a first mapping between IR data values representing temperatures and color-representing component values from a palette, the first mapping being invariable with respect to the range of the captured IR data values in the frame so as to maintain a fixed temperature-to-color mapping; and assigning, for each pixel, a value to the grayscale-representing component based on the IR data value of the pixel and according to a second mapping between IR data values and grayscale-representing component values from the palette, the second mapping being independent of the first mapping.

In some embodiments, a system includes: a focal plane array (FPA) comprising a plurality of detector elements responsive to infrared (IR) radiation emitted from an observed real world scene; and a processor. The processor may be configured to: receive a frame of IR data values captured by the FPA, wherein the frame comprises, for each detector element of the FPA, a pixel having an assigned one of the IR data values representing a temperature value associated with the infrared radiation emitted from the observed real world scene and received by the FPA; and generate a visual representation of at least a portion of the IR data values assigned to a corresponding set of the pixels, wherein the visual representation comprises, for each pixel, at least one color-representing component and a grayscale component according to a color model. The processor may be configured to generate the visual representation by: assigning, for each pixel, a value to the at least one color-representing component based on the IR data value of the pixel and according to a first mapping between IR data values representing temperatures and color-representing component values from a palette, the first mapping being invariable with respect to the range of the captured IR data values in the frame so as to maintain a fixed temperature-to-color mapping; and assigning, for each pixel, a value to the grayscale-representing component based on the IR data value of the pixel and according to a second mapping between IR data values and grayscale-representing component values from the palette, the second mapping being independent of the first mapping.

In some embodiments, a machine-readable medium stores non-transitory information comprising a plurality of machine-readable instructions which, when executed by one or more processors of a system, are configured to cause the system to perform a method comprising: receiving a frame of infrared (IR) data values captured by a detector comprising a plurality of detector elements, wherein the frame comprises, for each detector element, a pixel having an assigned one of the IR data values representing a temperature value associated with infrared radiation emitted from an observed real world scene and received by the detector element; and generating a visual representation of at least a portion of the IR data values assigned to a corresponding set of the pixels, wherein the visual representation comprises, for each pixel, at least one color-representing component and a grayscale component according to a color model. The generating of the visual representation involves: assigning, for each pixel, a value to the at least one color-representing component based on the IR data value of the pixel and according to a first mapping between IR data values representing temperatures and color-representing component values from a palette, the first mapping being invariable with respect to the range of the captured IR data values in the frame so as to maintain a fixed temperature-to-color mapping; and assigning, for each pixel, a value to the grayscale-representing component based on the IR data value of the pixel and according to a second mapping between IR data values and grayscale-representing component values from the palette, the second mapping being independent of the first mapping.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

The patent or application file contains at least one drawing executed in color. Copies of this patent or patent application publication with color drawings(s) will be provided by the Office upon request and payment of the necessary fee.

FIG. 14 shows an example of color representation of an IR image combined with grayscale representation of the IR image to obtain a visual representation of the IR image according to embodiments of the disclosure.

Embodiments of the present invention and their advantages are best understood by referring to the detailed description that follows. It should be appreciated that like reference numerals are used to identify like elements illustrated in one or more of the figures.

DETAILED DESCRIPTION

Introduction

In order to achieve humanly logical or intuitive display of temperature information, based on emitted infrared (IR) radiation, in a visual representation, one could assign fixed unique colors to each temperature within a selected or measured temperature span. Fixed mapping of colors and/or grayscale values to specific temperatures or temperature intervals may also be referred to as isotherm mapping. However, this typically leads to a low-contrast image. For example, with a camera temperature span between 0 and 100 degree Celsius, ranging from, for instance, blue for low temperatures to red for high temperatures within the temperature span, one could assign temperatures between 10 and 20 degree Celsius to different shades of blue. If the user then inspects, using such a thermal imaging device, or IR camera, at a wall indoors, in a room having a temperature of 18-19 degree Celsius, the entire visual representation, also commonly referred to as an IR image, would be substantially the same shade of blue, with little or no contrast between different parts of the image.

In some thermal imaging devices, or IR cameras, all the pixel values available via a certain color or grayscale palette would instead be associated with the temperature values between 18-19 degree Celsius, thereby providing a higher contrast, but lacking the advantage of achieving an intuitive interpretation of absolute temperatures as presented or represented in the visual representation, as there is no fixed connections between temperature values and pixel values/color values.

Hereinafter, the terms visual representation of IR data values, visual representation, and IR image are used interchangeably.

Method embodiments herein are typically described for a single frame of IR data values for easy understanding. Of course, the methods are applicable to any number of captured frames of IR data values and may be used in any thermal imaging device generating still images and/or video image sequences.

System Architecture

Thermal Imaging Device

Thermal imaging devices, such as thermography arrangements or IR cameras comprising an IR imaging system, are often used in various applications such as surveillance and inspection or monitoring of various objects buildings to capture IR data values, representing IR radiation emitted from an observed real world scene.

As known in the art, thermal imaging devices, or IR cameras with an IR imaging system, generally employ a lens working with a corresponding IR detector to provide an image of a view of an observed real world scene.

Figure 1:
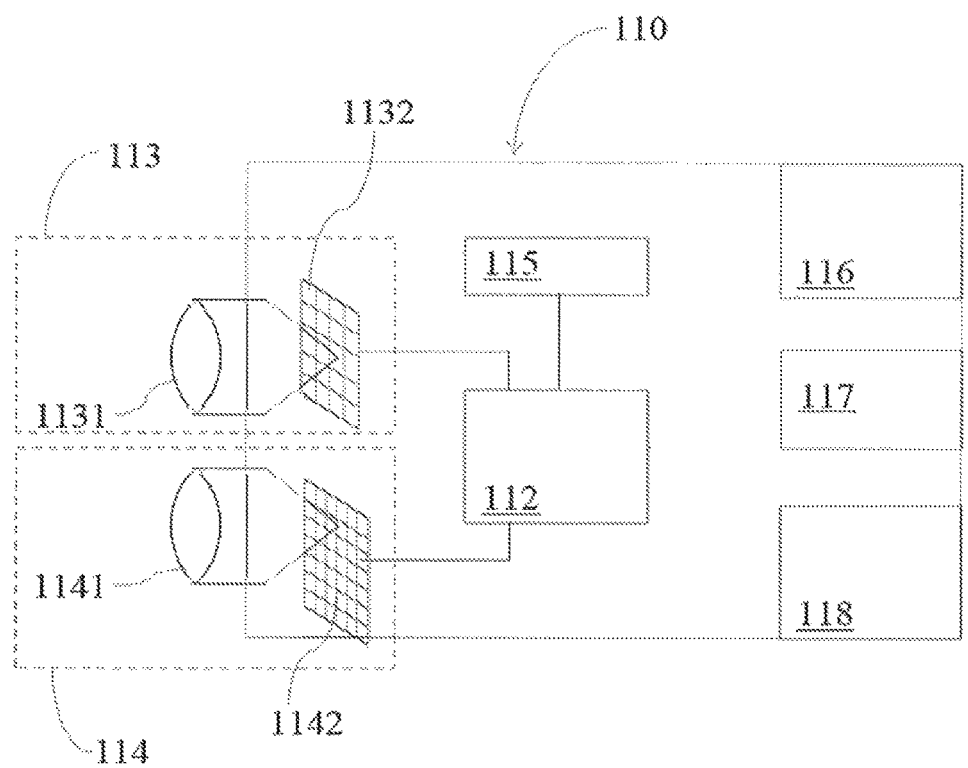
FIG. 1 shows a schematic view of a thermal imaging system according to embodiments of the disclosure.

FIG. 1 shows a schematic view of one or more embodiments of a thermal imaging device 110, e.g., in the form of a thermography arrangement or an IR camera, that is configured to capture IR data values, representing IR radiation emitted from an observed real world scene by an IR imaging system 113. In some embodiments, the infrared data values may refer to a subset of the infrared wavelengths, such as only thermal wavelengths. Said IR imaging system comprises an IR optical system 1131, e.g., comprising a lens, zoom functionality and focus functionality, together with a corresponding IR detector 1132, for example comprising a micro-bolometer focal plane array, arranged to provide an IR image in the form of a frame, or signal frame, of IR data values, representing IR radiation emitted from an observed real world scene. The IR imaging system 113 is further arranged to send the signal frame of IR data values to a processor 112. The thermal imaging device 110 further comprises a processor/processing unit 112 provided with specifically designed programming or program code portions adapted to control the processing unit 112 to perform the steps and functions of embodiments of the inventive method described herein. The thermal imaging device 110 further comprises at least one memory 115 configured to store data values or parameters received from a processor 112 or to retrieve and send data values or parameters to a processor 112. The thermal imaging device 110 further comprises a communications interface 116 configured to send or receive data values or parameters to/from a processor 112 to/from external units via the communications interface 116.

In one or more embodiments, said external unit is a computing device 230. In one or more embodiments, the external unit 230 is communicatively coupled to the thermal imaging device 110, via one-way or two-way communication, as illustrated by the dashed arrow in FIG. 2.

In one or more embodiments, said IR imaging system 113 comprised in said thermal imaging device 110 is configured to capture multiple consecutive IR images as a stream of IR images, such as a video stream with a given frame rate.

An embodiment of the operation of such a thermal imaging device 110, such as an IR camera, is generally as follows: IR energy is accepted via said IR optical system 1131 and directed onto the detector elements of the IR detector 1132. Each detector element responds to the IR radiation or heat energy received. A frame of IR data values may, for example, be captured by scanning all the rows and columns of the detector and, in some embodiments, analog to digital converted to obtain a captured IR image wherein data values associated to each detector element are referred to as IR image pixels each having an associated row and column index.

In one or more embodiments the thermal imaging device 110 further comprises a visible light (VL) imaging system 114 that is configured to capture VL data values, representing VL emitted from an observed real world scene. In some embodiments, a broader wavelength range, such as a wavelength range corresponding to non-thermal data values, may be used in place of the visible light discussed herein. Said VL imaging system 114 employs a VL optical system 1141, e.g., comprising a lens, zoom functionality and focus functionality together with a corresponding VL detector 1142, for example comprising a digital charge-coupled device (CCD) or complementary metal-oxide-semiconductor (CMOS) active pixel sensors, to provide a VL image in the form of a frame, or signal frame, of VL data values, representing VL emitted from an observed real world scene. The VL imaging system 114 is further configured to send the signal frame of VL data values to the processor 112, 212 and the processor 112, 212 is further configured to receive and process the received frame of VL data, e.g., combining the VL data with IR data thereby creating a combined, blended, or fused VL/IR data representation. The processor 112, 212 may further be configured to send the VL data, IR data, or combined VL/IR data to a display unit 118, 218 for display. In one or more embodiments said thermal imaging devices, such as thermography arrangements or IR cameras comprising an IR imaging system, further comprises a VL imaging system configured to capture VL image data values, representing VL emitted or reflected from said observed real world scene, that is captured substantially simultaneously with said IR image.

In one or more embodiments the thermal imaging device 110 further comprises a display device 118 configured to receive a signal from a processor 112 and to display the received signal as a displayed image, e.g., to a user of the thermal imaging device 110.

In one or more embodiments the thermal imaging device 110 further comprises one or more input devices 117 configured to receive input or indications from a user, e.g., a user to indicate a local area of interest in an IR image. According to an embodiment, the one or more input devices 117 are configured to receive input from a user and in other words enable a user to provide input to the thermal imaging device 110. According to an embodiment, the input device 117 comprises a selection of one or more control devices for inputting commands and/or control signals, such as an interactive display, e.g., a touch or pressure sensitive display, a joystick, a mouse, a keyboard and/or record/push-buttons.

In one or more embodiments the thermal imaging device 110 further is adapted to be a handheld type thermal imaging device 110 or a fixed mounted monitoring type thermal imaging device 110.

In one or more embodiments the thermal imaging device 110 is configured as one device in which the IR imaging system 113 and the VL imaging system 114 are integrated.

In one or more embodiments the thermal imaging device 110 is configured as two physically separate devices, i.e., a first device comprising a IR imaging system 113 and second device comprising a VL imaging system 114, communicatively coupled and depicting, or capturing, substantially the same observed real world scene. A memory 115 may be integrated into either one or the first or second device or a memory 115 may be integrated in a physically separate memory device, not shown in the figure, to which said first and second device is communicatively coupled.

In one or more embodiments the thermal imaging device 110 is configured to capture IR data values, representing IR radiation emitted from an observed real world scene and then further to correct or calibrate captured data values by applying predetermined IR temperature calibration data parameters, to map and scale the captured data values for display as an IR, or thermal, image, singly or combined with a VL image, according to methods known in the art.

In one or more embodiments the IR imaging system 113 comprised in the thermal imaging device 110 is further arranged to send a signal frame of IR data values to a processor 112 or to intermediate storing in a memory comprised in or separate (e.g., external or remote) from the thermal imaging device 110.

In one or more embodiments the IR imaging system 113 comprised in the thermal imaging device 110 is further arranged to send the signal frame of IR data values to an external processor/processing unit (not shown in FIG. 1) from said intermediate storing via said communications interface 116.

In one or more embodiments the processor/processing unit 112 comprised in the thermal imaging device 110 is further arranged to send the received IR image as a signal frame of IR data values to a an external processor/processing unit (not shown in FIG. 1) directly or from said intermediate storing via said communications interface 116.

In one or more embodiments the processor/processing unit 112 may be a processor such as a general or specific purpose processor/processing unit for example a microprocessor, microcontroller or other control logic that comprises sections of code or code portions, stored on a non-transitory machine-readable medium, such as a memory 115, that are fixed to perform certain tasks but also other alterable sections of code, stored on a machine-readable medium, that can be altered during use. Such alterable sections of code can comprise parameters that are to be used as input for the various tasks, such as the calibration of the thermal imaging device 110, adaption of the sample rate or the filter for the spatial filtering of the images, contrast enhancement, or any other parameter related operations known to a person skilled in the art.

In some embodiments, a machine-readable medium stores non-transitory information comprising a plurality of machine-readable instructions which when executed by one or more processors of a device are configured to cause the device to perform a method comprising: receiving a frame of infrared (IR) data values captured by a detector comprising a plurality of detector elements, wherein the frame comprises, for each detector element, a pixel having an assigned one of the IR data values representing a temperature value associated with infrared radiation emitted from an observed real world scene and received by the detector element; generating a visual representation of at least a portion of the IR data values assigned to a corresponding set of the pixels by, for each pixel: mapping, for a first set of pixel value components, a color value of a palette based on a predetermined fixed relation between the color value and the temperature value associated with the IR data value of the pixel; and assigning, to said first set of pixel value component, a representation value from the color model dependent on the mapping.

In some embodiments, a machine-readable medium store non-transitory information comprising a plurality of machine-readable instructions which when executed by one or more processors of a device are configured to cause the device to perform a method or function according to any of the method embodiments presented herein.

In one or more embodiments the processor/processing unit 112 is configurable using a hardware description language (HDL).

In one or more embodiments the processor/processing unit 112 is a field-programmable gate array (FPGA), i.e., an integrated circuit designed to be configured by the customer or designer after manufacturing and configurable using HDL. For this purpose embodiments of the invention comprise configuration data configured to control an FPGA to perform the steps and functions of the method embodiments described herein.

In this document, the terms "computer program product", "computer-readable medium", and "machine-readable medium" may be used generally to refer to media such as a memory 115 or the storage medium of processing unit 112 or an external storage medium. These and other forms of storage media may be used to provide instructions to processing unit 112 for execution. Such instructions, generally referred to as "computer program code" (which may be grouped in the form of computer programs or other groupings), when executed, enable the IR camera 110 to perform features or functions of embodiments of the current technology. Further, as used herein, "logic" may include hardware, software, firmware, or a combination of thereof.

In one or more embodiments the processor/processing unit 112 is communicatively coupled and communicates with a memory 115 where parameters are kept ready for use by the processing unit 112, and where the images being processed by the processing unit 112 can be stored if the user desires. The one or more memories 115 may comprise a selection of a RAM, disk drive, a floppy disk drive, a magnetic tape drive, an optical disk drive, a CD or DVD drive (R or RW), or other removable or fixed media drive.

Figure 2:
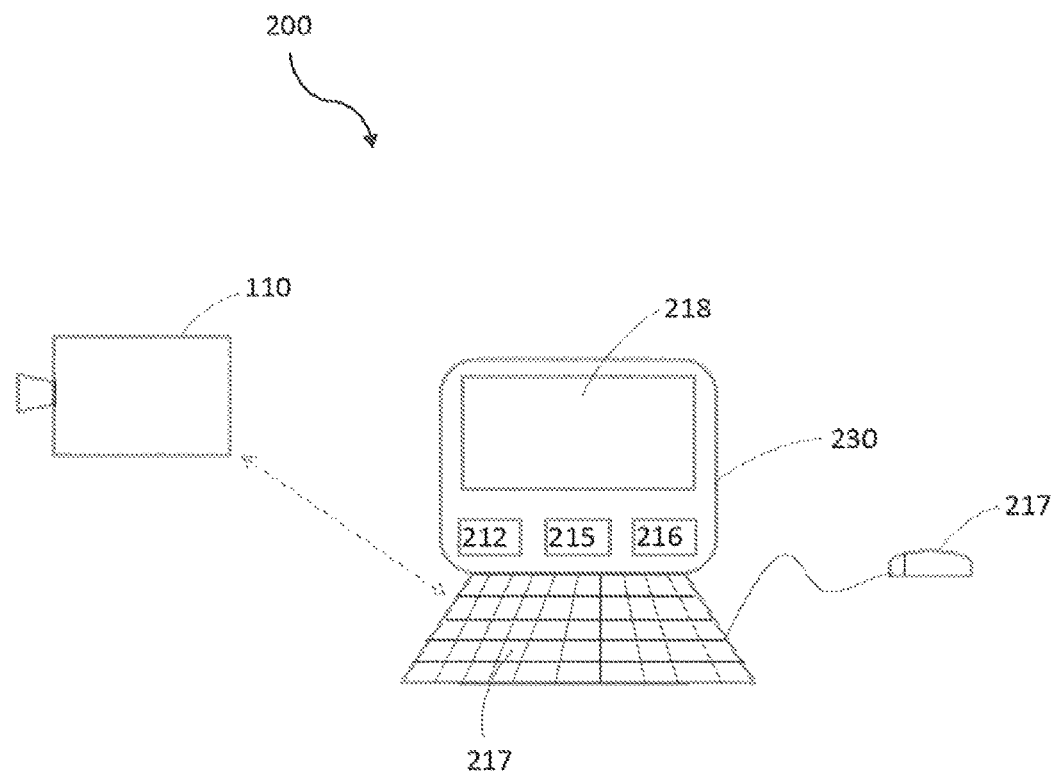
FIG. 2 shows a schematic view of a system according to embodiments of the disclosure.

FIG. 2 is a schematic view of thermal imaging system 200 in accordance with one or more embodiments of the invention, wherein the processor/processing unit 112 comprised in the thermal imaging device 110 is further arranged to send the received IR image as a signal frame of IR data values to an external processor/processing unit 212, and wherein said external processor/processing unit 212 is comprised in a computing device 230 such as a tablet computer, a laptop, PDA, smartphone, mobile phone, cellular communications device, or a desktop computer. Said external processor/processing unit 212 is further arranged to receive said IR image as a signal frame of IR data values via an communication interface 216, e.g., from processor/processing unit 112. The external processor/processing unit 212 is provided with specifically designed programming or program code portions adapted to control the processing unit 212 to perform the steps and functions of embodiments of the inventive method described herein. The computing device 230 may further comprise one or more user input devices 217 configured to receive input or indications from a user and a display 218 configured to receive a display signal from said external processor/processing unit and to display the received signal as a displayed image, e.g., to a user of the computing device 230. The computing device 230 further comprises at least one memory 215 configured to store data values or parameters received from a processor 212 or to retrieve and send data values or parameters to a processor 212. The computing device 230 further comprises a communications interface 216 configured to send or receive data values or parameters to/from a processor 212 and to/from external units, such as said thermal imaging device 110, via the communications interface 216. The computing device 230 further comprises at least one memory 215 configured to store data values or parameters received from a processor 212 or to retrieve and send data values or parameters to a processor 212.

In one or more embodiments the display 218 is integrated with a user input device 217 configured to receive input or indications from a user, e.g., by applying touch screen functionality and to send a user input signal to said processor/processing unit 212.

In one or more embodiments the user input device 217 comprised or communicatively coupled to said computing device 230 is configured to receive input or indications from a user by applying eye tracking techniques (e.g., in one or more conventional ways as would be understood by one skilled in the art). In one or more embodiments the user input device is configured to enable control functionality of the computing device 230 and/or the thermal imaging device 110.

Generation of Visual Representations

As thermal images by nature are generally low contrast and noisy, the captured IR image may be subjected to various image processing to improve the interpretability of the image before displaying it to a user. Examples of such image processing is correction with IR temperature calibration data parameters, low pass filtering, registration of multiple successive IR images and averaging to obtain a averaged IR image, contrast enhancement, or any other suitable IR image processing operation known to a person skilled in the art.

As IR radiation is not visible to the human eye there is no natural relation between the captured IR data values of each pixel in an IR image and grayscale and/or colors displayed on a display device. Therefore an information visualization process commonly referred to as false color or pseudo color is used to map captured the IR data value of each pixel in a captured frame of IR data values to a palette comprising color or grayscale values.

A palette typically comprises a finite set of color and/or grayscale representations selected from a color model (e.g., grayscale values ranging from white to black via monochrome color levels, RGB, CIEXYZ, CIELab, or any other known color model suitable for representing color and/or grayscale values on a display device, some further non-limiting examples being YCrCb, HSV and CMYK color models.) for pseudo-coloring of images through assigning of the color and/or grayscale representations to pixels according to predefined mapping rules. A predefined palette represents a finite set of grayscale and/or color values of a color model displayable on a display device thereby making it visible to the human eye.

A color model applied to a digital image typically describes pixel values in terms of two or more pixel value components that are combined to obtain the visual impression of the intended color or grayscale value. In the present disclosure, pixel value components are roughly divided into two types based on what type of information they describe.

One type of pixel value component represents different color channels or chromaticity values that are combined through addition or subtraction, such as e.g., the components in CMYK, the components in RGB, the a and b components in CIELab, and the Cr and Cb components in YCrCb, or equivalents of these examples. This type of pixel component may hereinafter be referred to as color-representing components.

Another type of pixel value component represents luminance, intensity or grayscale variations, such as the L in CIELab, the Y in YCrCb, or the V in HSV, or equivalents of these examples. This type of pixel component may hereinafter be referred to as grayscale-representing pixel value components. Thus, in various embodiments, palettes associated with visual representations of IR images or pixels in visual representations of IR images may comprise values for at least one color-representing component and values for at least one grayscale component.

In some embodiments, methods comprise generating a visual representation of captured IR data values by mapping color and/or grayscale values to each pixel of a captured frame of IR data values, thereby assigning each pixel of the frame of IR data values a representation value from a color model, based on the associated temperature value of the pixel.

In some embodiments, methods, thermal imaging devices, and non-transitory computer program products provide a scalable palette that is dynamically adaptable to the temperature range of the temperatures associated with the pixels of a frame of captured IR data values. According to embodiments, the temperature range is user-selectable.

Method Embodiments

Figure 3:
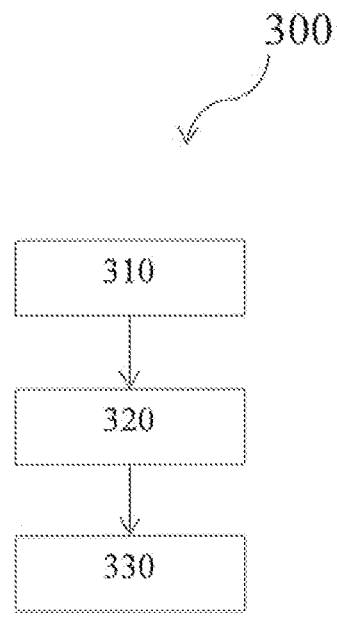
FIG. 3 is a block diagram showing method embodiments of the disclosure.

FIG. 3 shows one or more embodiments of a method 300 for generating an enhanced visual representation of IR data values based on a captured frame of IR data values captured using a detector having a number of detector elements, the captured frame of IR data values comprising, for each detector element, an IR pixel being assigned an IR data value representing a temperature value associated with the IR radiation emitted from an observed real world scene and received by said detector element.

STEP 310: receiving a control signal.

In an embodiment, the control signal is indicative of a specific application.

In an embodiment, the control signal is indicative of a selection of an application, which may also be referred to as a use case scenario, use case application, or a mode. The mode may be selected by a user, using an input device 117 to input the selection, or automatically selected based on settings of the thermal imaging device 110. The processor may further be configured to receive a control signal and interpret the control signal as being indicative of a selection of a specific application.

Examples of use case specific scenarios, applications, or modes may be smoke detection, maintenance of buildings, electrical systems surveillance or inspection, heating and/or ventilation surveillance or inspection, food inspection, and others where appropriate.

In embodiments, the control signal is a user input signal received from an input device 117, wherein the user input signal indicates a thermal imaging device or system specific application, or professional application scenario, indicated and thereby selected by a user. For example, a user may select from a menu one of several scenarios, applications, or modes, identified in the menu by names indicative of the scenarios, such as "refrigerator inspection", "food inspection", "power plant inspection", "Tuesday morning", or any other suitable name, or the scenarios may be identified in the menu as numbers, letters or codes. The menu alternatives may be set as default alternatives during production or calibration of the thermal imaging device 110 and/or they may be added by the user during operation of the thermal imaging device 110.

In an embodiment, the control signal is received in response to a manual input, e.g., by a user using an input device 117.

In an embodiment, the processor 112, 212 is configured to receive a control signal, according to a protocol known in the art (e.g., in one or more conventional ways as would be understood by one skilled in the art).

In some embodiments, step 310 may also include receiving a frame of IR data values captured by a detector comprising a plurality of detector elements, wherein the frame comprises, for each detector element, a pixel having an assigned one of the IR data values representing a temperature value associated with infrared radiation emitted from an observed real world scene and received by the detector element. In some embodiments, the infrared data values may refer to a subset of the infrared wavelengths, such as only thermal wavelengths. In some embodiments, the control signal may be received separately before or after the frame of IR data values and in any number of steps.

STEP 320: selecting a palette, from a predefined list of palettes, based on the received control signal, wherein said selected palette represents predetermined relations between a predefined number of temperature ranges and multiple representation values in a color model.

The processor 112, 212 may further be configured to select a palette, from a predefined list of palettes, based on said received control signal, wherein said selected palette represents predetermined relations between a predefined number of temperature ranges and multiple representation values in a color model.

In an embodiment, the predetermined relations represented by the selected palette define fixed relations between a predefined number of temperature ranges and multiple representation values in a color model. Fixed relations, also referred to as isotherm mapping, are further described herein.

In an embodiment, the palette is scalable as further described herein. In an embodiment, the predetermined relation is a function that describes the association between the temperature ranges and color and/or grayscale values either linearly, for the first level of the scalable palette, or non-linearly over several levels of the scalable palette.

Method step 320 may further comprise using said palette in a scalable manner, by selecting a temperature span that is a subset of an available temperature range and applying a scale of the available temperature range to the selected temperature span.

In an embodiment, the processor 112, 212 is configured to use said palette in a scalable manner, by selecting a temperature span that is a subset of the available temperature range and applying the scale of the available temperature range to the selected temperature span.

STEP 330: generating a visual representation of said IR data values assigned to a corresponding set of pixels by: mapping a color or grayscale value comprised in said selected palette to each pixel of said frame of IR data values based on the predetermined relation between the color or grayscale value and the temperature value associated with said pixel of said frame of IR data values; and assigning each pixel of said frame of IR data values a representation value from said color model dependent on said mapping. In other words, a visual representation, or an IR image, is obtained, colorized according to the selected palette, thereby optimized with regard to the use case scenario and enabling easy interpretation and analysis for a user later viewing the IR image.

In some embodiments, step 330 may also include presenting (e.g., displaying) the generated visual representation on a display (e.g., as an image or otherwise). In some embodiments, the presenting may be performed separately from the generating.

In an embodiment, the method further comprises selecting a portion of said IR data values, wherein the step of generating a visual representation comprises applying said selected palette to each pixel of said selected portion of said IR data value representation. The selected portion may comprise all, or only some of, the IR data values. The set of pixels may comprise all, or only some of, the pixels of the frame.

In an embodiment, the processor 112, 212 is configured to select a portion of said IR data values, wherein the step of generating a visual representation comprises applying said selected palette to each pixel of said selected portion of said IR data value representation. The selected portion may comprise all, or only some of, the IR data values. The set of pixels may comprise all, or only some of, the pixels of the frame.

In an embodiment, the predetermined relation represented by the selected palette defines fixed relations between a predefined number of temperature ranges and multiple representation values in a color model, and the processor 112, 212 is configured to assign each pixel of the frame of IR data values a representation value from the color model dependent on the fixed relations mapping.

In an embodiment said first predetermined relation and a first predetermined palette is obtained by a processor 112/212, comprised in the thermal imaging device 110 or comprised in said computing device 230, from a memory 115 or any other non-transitory computer-readable storage media known per se (e.g., in one or more conventional ways as would be understood by one skilled in the art).

In some embodiments, the predetermined palette is represented in a color model, such as a HSV, YCrCb, or CIELab model, having at least one color-representing component and a grayscale-representing component, and the predetermined relation provides a fixed and consistent mapping of a temperature represented by the IR data value to a value for the at least one color-representing component from the predetermined palette.

In other words, unlike many conventional IR image representation techniques, a certain temperature or temperature interval is always represented by a certain "coloredness," which is not varied in relation to the temperature range of a scene. Thus, users viewing a visual representation of an IR image generated according to such embodiments can advantageously develop a fixed and intuitive association between colors and temperatures, and use the IR image much like a visual thermometer to quickly and intuitively read temperatures of objects in a scene by their colors.

In addition, in such embodiments, the grayscale-representing component of the palette may be mapped separately and independent of the fixed temperature-to-color mapping according to various techniques further discussed herein to improve contrast and interpretability of the generated visual representation of the IR image.

Thus, in such embodiments, the generating in step 330 a visual representation of the IR data values assigned to a corresponding set of pixels comprises, for each pixel:

mapping, for a first set of pixel value components, a color value of a palette based on a predetermined fixed relation between the color value and the temperature value associated with the IR data value of the pixel, and assigning, to said first set of pixel value component, a representation value from the color model dependent on the mapping.

Expressed in another way, the generating a visual representation of the IR data values in step 330 comprises assigning, for each pixel, a value to at least one color-representing component of the pixel according to a fixed color mapping between the IR data value of the pixel representing a temperature and a color-representing component value from the palette.

Figure 11B:
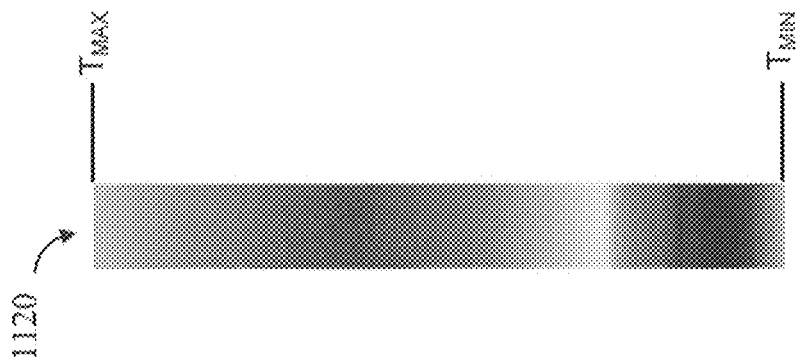
FIG. 11B shows an exemplary visual representation of a palette used for generating the visual representation of the IR image as shown in FIG. 11A according to embodiments of the disclosure.
Figure 11A:
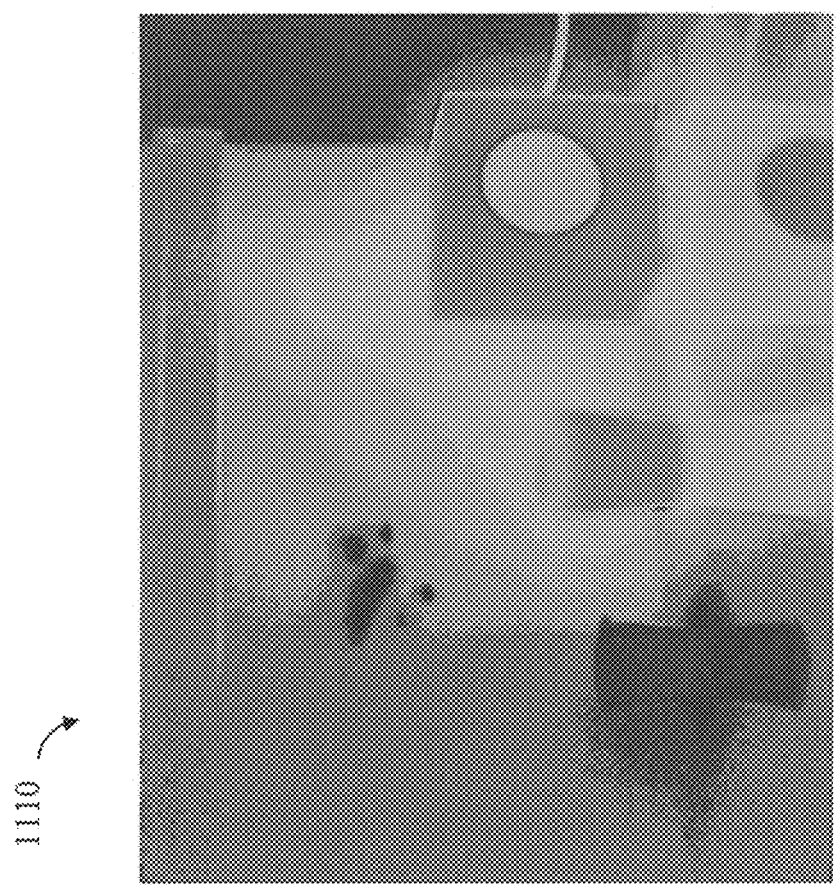
FIG. 11A shows an example of visual representation of an IR image obtained using embodiments of the disclosure.

After the at least one color-representing component of each pixel is assigned a value in such a way, the visual representation of IR data values representing temperatures may be based solely on one or more color-representing pixel value component of a color model, e.g. hue and/or saturation. An example of such a visual representation is shown as an IR image frame 1110 in FIG. 11A, with a corresponding palette 1120 with just the fixed color mapping applied shown in FIG. 11B. In other words, a user viewing a visual representation of an IR image where one or more pixel value components have been assigned values by mapping the temperature information associated with the pixels using a palette of this type will see pixels having pure color values, without any grayscale information (e.g., the grayscale values for all pixels are set to a same value and thus do not represent any information). Thus, as shown in the example of FIG. 11A, a visual representation of an IR image generated by applying a fixed color mapping may result in an image frame that has low contrast because neighboring temperature values map to similar colors according to the fixed color mapping that typically has to cover a wide temperature span (e.g., substantially the entire usable temperature span of a particular thermographic device).

In this regard, as briefly discussed above, the grayscale components of the pixels in a visual representation may be assigned values separately by applying another mapping that is independent of the fixed temperature-to-color mapping. Thus, the generating in step 330 may further comprise assigning a value to a grayscale-representing component of the pixel according to a grayscale mapping that is independent of the fixed color mapping.

For example, in some embodiments, the generating in step 330 further comprises assigning to a second set of pixel value components a grayscale value based on the temperature value associated with the IR data value of the pixel in relation to the range of temperature values associated with the IR data values of all pixels in the current frame of infrared (IR) data values. In embodiments, the relation of the temperature value associated with the IR data value of the pixel and the range of temperature values associated with the IR data values of all pixels in the current frame of infrared (IR) data values gives that a pixel having a high temperature within the temperature range of the current IR image frame/frame of IR data values will have a grayscale value close to one of the endpoints of the grayscale spectrum (e.g. close to white or black).

In some embodiments, the independent grayscale mapping may be a periodic function (e.g., a periodic filter or pattern) to provide grayscale variations in the visual representation of the IR image to enhance contrast and interpretability between neighboring pixels corresponding to similar temperatures, as further described herein with respect to FIGS. 8, 9, 12A-B, and 13A-B, for example.

As may be appreciated, if a target display or target image file format utilizes a different color model than the palette or the visual representations of the IR images, appropriate color space conversion may be carried out before the visual representations of the IR images are displayed or stored.

In some device embodiments, there is provided a memory configured to store a plurality of computer readable instructions which when executed by the processor 112, 212 are configured to cause the device to perform a method comprising: generating a visual representation of at least a portion of the IR data values assigned to a corresponding set of the pixels comprises, for each pixel: mapping, for a first set of pixel value components, a color value of a palette based on a predetermined fixed relation between the color value and the temperature value associated with the IR data value of the pixel, and assigning, to said first set of pixel value component, a representation value from the color model dependent on the mapping.

In some embodiments, method steps 310 and 320 are optional. The control signal may according to embodiments described under step 310 be indicative of a mode that is automatically selected based on settings of the thermal imaging device 110. The palette may further be a palette selected according to any of the embodiments of step 320, or a preselected palette. In some embodiments, the first set of pixel value components comprises one or more color-representing pixel value components according to a color model. The set of pixel value components may comprise only one color-representing component, or more than one. For example, the first set of pixel value components may comprise a hue component and/or a saturation component. In some device embodiments, the memory is further configured to store a plurality of computer readable instructions which when executed by the processor 112, 212 are configured to cause the device to perform a method comprising: assigning to a second set of pixel value components a grayscale value based on the temperature value associated with the IR data value of the pixel in relation to the range of temperature values associated with the IR data values of all pixels in the current frame of infrared (IR) data values.

Figures 12A, 12B:
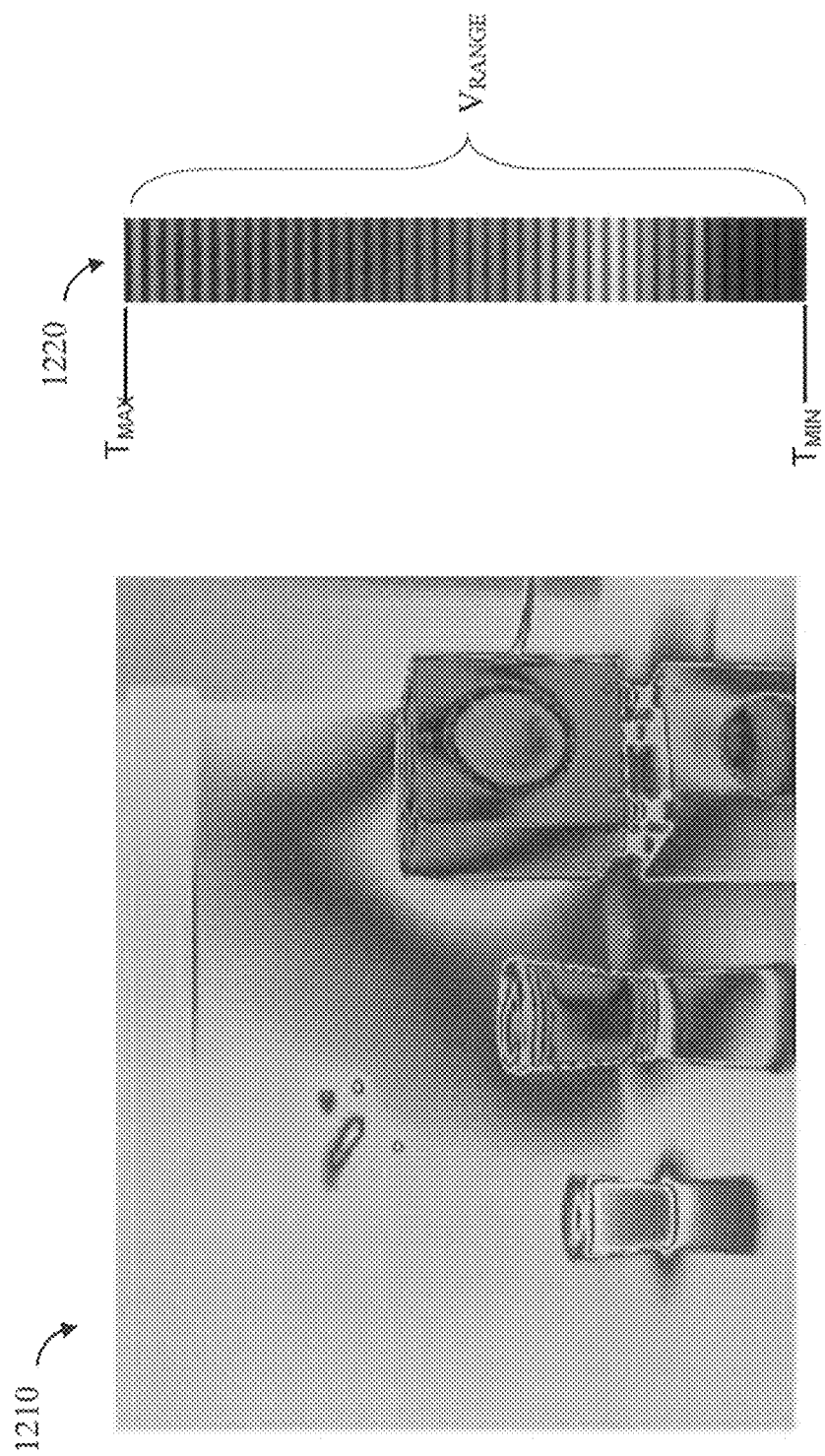
FIG. 12A shows an example of visual representation of an IR image obtained using embodiments of the disclosure.
FIG. 12B shows an exemplary visual representation of a palette used for generating the visual representation of the IR image as shown in FIG. 12A according to embodiments of the disclosure.

FIG. 12A shows an example of visual representation 1210 of an IR image obtained using such an embodiment. FIG. 12B shows an exemplary visual representation of a corresponding palette 1220 used for generating the visual representation 1210 of the IR image as shown in FIG. 12A. By having a fixed mapping of color to temperature, but dynamically assigning grayscale values to grayscale pixel components independent of the fixed color-to-temperature mapping, a consistent color representation is achieved, where a user can learn to identify a certain color as representing a certain temperature or temperature interval. Grayscale information is added to increase contrast and improve interpretability.

In some embodiments, the grayscale information may be dynamically assigned, in that all available grayscale values that the thermal imaging device is able to reproduce, according to its performance and settings, may be used for representing the temperature information in a current IR image frame, or a sequence of consecutive IR image frames. This means that, e.g., a temperature value that is almost white in one IR image frame may be almost black in another IR image frame, dependent on the temperature range that is represented in the observed scene. According to such embodiments, one way of maximizing the contrast and thereby visibility and interpretability of the imaged scene is obtained. In other words, colors are consistently mapped to temperature information to obtain consistent connections between color and temperature and help the user interpret the resulting IR images, while the grayscale information is in these embodiments dynamically adjusted such that an optimized contrast is obtained for the entire span of temperatures in each IR image.

Figure 10B:
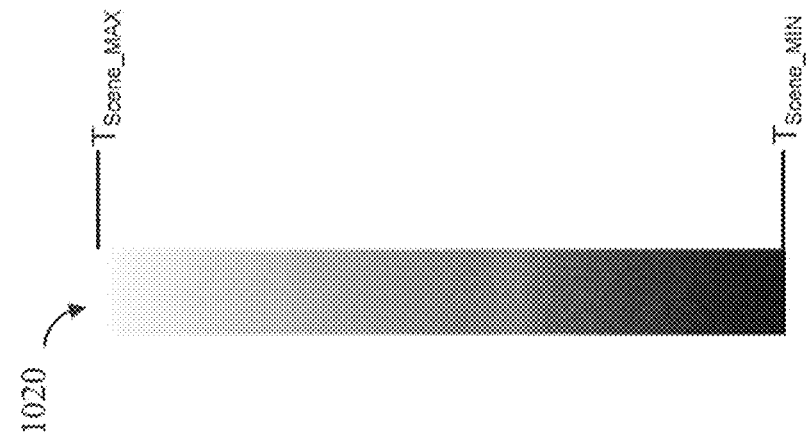
FIG. 10B shows an exemplary visual representation of a palette used for generating the visual representation of the IR image as shown in FIG. 10A.
Figure 10A:
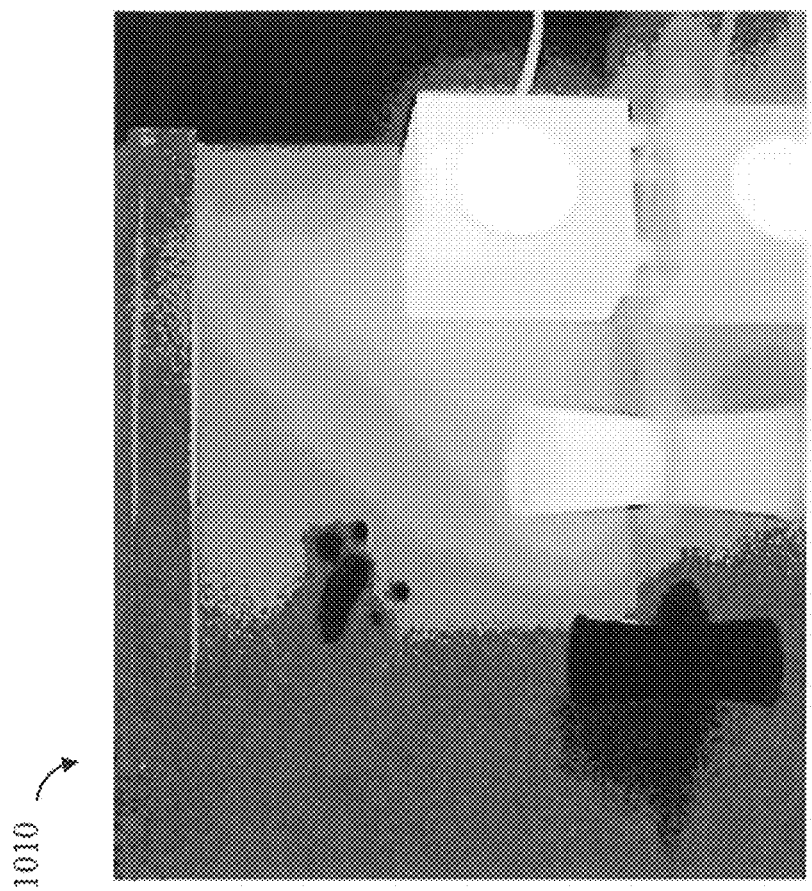
FIG. 10A shows an example of visual representation of an IR image according to a prior art embodiment.

For comparison, FIG. 10A shows an example of a visual representation 1010 of an IR image generated using conventional techniques, and FIG. 10B shows an exemplary visual representation of a palette 1020 used for generating the visual representation of the IR image shown in FIG. 10A. As shown in the example of FIGS. 10A and 10B, the mapping from temperatures (e.g., IR data values) to available color and/or grayscale component values in palette 1010 is defined relative to the scene temperature span (e.g., relative to the maximum and minimum temperatures in an observed scene, labeled $T_{Scene\_Max}$ to $T_{Scene\_Min}$ in FIG. 10B) or is otherwise variable, dynamic, or relative in other examples. While such relative or variable mappings can increase contrast by exaggerating color and/or grayscale differences in a visual representation of different IR data values (e.g., different temperatures), there is no meaningful and consistent association between the colors in the visual representation 1010 of the IR image and the actual temperature.

In comparison, in the example visual representation 1210 of an IR image generated according to embodiments of the disclosure and the corresponding representation of palette 1220 of FIGS. 12A and 12B, the temperature-to-color mapping is consistently maintained for an entire temperature span associated with the thermographic arrangement according to its settings or parameters (e.g., from the minimum to the maximum temperature detectable by the infrared camera, labeled $T_{MIN}$ and $T_{MAX}$ in FIG. 12B) such that a specific color always represents a specific temperature or temperature interval. Furthermore, compared with the example visual representation 1110 of the IR image in FIG. 11A, the example visual representation 1210 according to embodiments of the disclosure has significantly enhanced contrast and feature visibility, since neighboring pixels associated with temperature values that are very similar (small differences in temperature) have larger differences in their grayscale components due to the independent grayscale mapping that varies the value of the grayscale component according to a periodic filter (e.g., by applying a periodic function or pattern). Thus, the objects in the depicted scene are easily recognizable and the temperature distribution is more readily interpretable to a user viewing the visual representation 1210 compared to visual representations 1010 and 1110.

FIG. 14 illustrates another example of dynamically assigning grayscale values independent of a fixed temperature-to-color mapping. In FIG. 14, grayscale-representing components of the pixels in a visual representation 1430 are mapped relative to a scene temperature span (e.g., relative to the maximum and minimum temperatures in an observed scene, labeled $T_{Scene\_Max}$ to $T_{Scene\_Min}$ in FIG. 14), while color-representing components are assigned values according to a fixed temperature-to-color mapping that covers an entire temperature range (e.g., from the minimum to the maximum temperature detectable by the infrared camera, labeled $T_{MIN}$ and $T_{MAX}$ in FIG. 14).

As illustrated by FIG. 14, such an operation of dynamically assigning grayscale values independent of a fixed temperature-to-color mapping may also be understood or implemented as an operation to combine a detailed grayscale image having high contrast grayscale information with a colored image having an easy-to-interpret consistent color to temperature mapping. In FIG. 14, information of a detailed grayscale representation 1410 of an IR image frame is combined with information of a pseudo colored visual representation 1420 of the same IR image frame, the visual representation 1420 being based on a fixed, or consistent, color to temperature mapping. The pixels of the visual representation 1410 have been assigned grayscale pixel values by mapping using the palette 1440, wherein the palette 1440 is based on a dynamic relation between grayscale values and respective temperature values associated with the IR data values of the pixels depending on the scene temperature range. The pixels of the visual representation 1420 has been assigned color pixel values by mapping using a palette 1450, wherein the palette 1450 is based on a predetermined fixed relation between color values and the temperature values associated with the IR data values of the pixels.

Through the combination, a resulting combined visual representation 1430 is obtained. The combination is further illustrated in FIG. 14 by a combined palette 1460 comprising information from both palettes 1440 and 1450 (e.g., color-representing components from palette 1450 and a grayscale component from palette 1440). As is readily apparent to a person skilled in the art, visual representations of palettes in connection with embodiments presented herein are not limited to the illustrated examples of the figures, but may be represented in any suitable manner.

In embodiments described in connection with FIG. 3, this is achieved by combining color-representing pixel value components, obtained by mapping temperature information to a color palette, and grayscale-representing pixel value information, thereby a new visual representation of the IR image frame with complete pixel values showing intuitive color information and added contrast through inclusion of grayscale information. Embodiments having consistent color to temperature mapping and contrast added by grayscale information is advantageous for interpretability and color consistency. The greyscale component for the pixels of an IR image (e.g. the V component in color space HSV) may span the entire range of grayscale values available for representing temperature information in the IR image. Thus, the grayscale component for the pixels of the IR image frame has a high resolution and thus provides high contrast to the generated IR image frame.

In some embodiments, the second set of pixel value components comprises an intensity component and/or a luminance component. The second set of pixel value components may comprise one grayscale-representing pixel value component.

In embodiments, a user is enabled to generate a customized or application specific palette by selecting the color and/or grayscale values that will be mapped to certain temperature values or intervals, according to method embodiments described herein, using an input device 117, 217. In further embodiments, the user is enabled to store the generated palette as a palette file by performing a storing selection action using an input device 117, 217. The processing unit 112, 212 may further be configured to receive input from the input device 117, 217, possibly via the communication interface 116, indicating a mapping between color and/or grayscale values to temperature values or intervals and generate a palette based on said received input. The processor 112, 212 may further be configured to store said generated palette in a memory 115, 215, either automatically in response to a palette being generated or in response to a save control signal received from an input device 117, 217. The processor 112, 212 may further be configured to receive or retrieve said stored palette from said memory 115, 215 at a later time, in response to a control signal, and use it to generate a visual representation in accordance with methods described herein.

In an embodiment, a data file representing a palette as defined herein may be uploaded to the thermal imaging device 110, via a wired or wireless connection, from a storage external to the thermal imaging device 110. The palettes may for instance comprise isotherm mapping of colors and/or grayscale values to temperature values, possibly including alarm colors and/or grayscale values, and the palette may be scalable according to method embodiments presented herein.

By enabling setting, storing, and retrieval or uploading of palettes, a user may for example generate an application specific palette that is advantageous for a certain application and then retrieve and use it at a later time for a similar application, or share it with colleagues who work with similar investigations or in similar environments, via wired or wireless communications networks. This is advantageous compared to previous methods wherein levels and ranges for colors, grayscale values, and/or temperatures must typically be manually set by a user during operation of the thermal imaging device.

Scalable Palette

The use of a scalable palette provides an optimized contrast in the generated visual representations, also referred to as IR images. By optimizing the contrast in the IR images by adaptation of the palette applied, a user presented with the IR image is enabled to easier interpretation of the IR image, which supports the "walk-up-and-use" behavior.

According to embodiments, fixed mapping of colors or grayscale values to specific temperatures or temperature intervals is combined with the use of a scalable palette, thereby supporting the "walk-up-and-use" behavior and further providing the combined benefits of increased accuracy and consistent data display while reducing complexity and increasing the intuitive interpretability in order to enhance the user experience with regard to viewing and analyzing a visual representation of IR data values. Fixed mapping of colors or grayscale values to specific temperatures or temperature intervals may also be referred to as isotherm mapping.

Another advantage achieved is that it requires low computational effort to generate the high contrast visual representations since there is a limited number of color and/or grayscale values. A further advantage is the low storage requirements as an IR image representation comprising few color and/or grayscale values may be hard compressed while maintaining high visual quality.

Mapping of captured IR data values of each pixel in an IR image to a palette used to present the corresponding pixel displayed on a display is typically performed by applying a predetermined relation, wherein said predetermined relation describes a mapping from IR data values to said predefined palette, although other mapping methods are of course also possible, as is readily apparent to a person skilled in the art.

Figure 4:
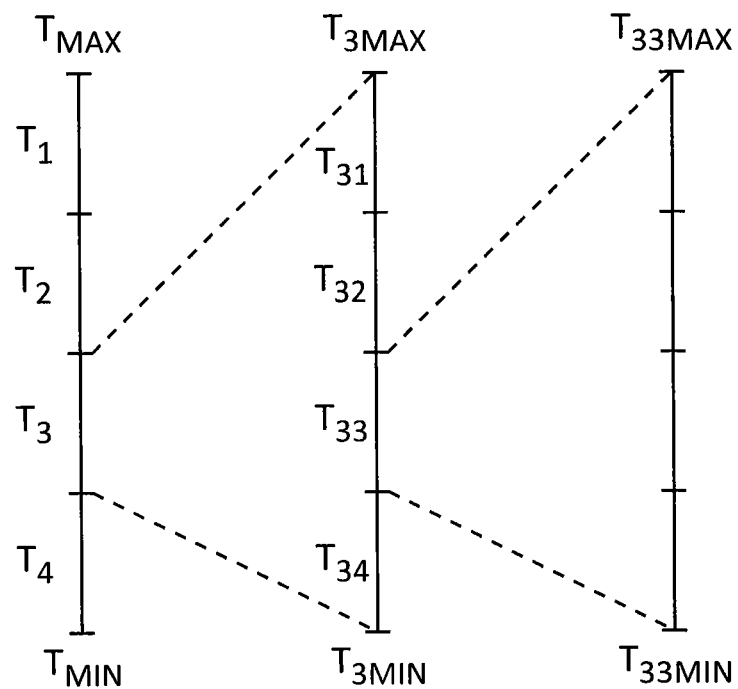
FIGS. 4 to 6 show scalable palettes according to embodiments of the disclosure.
Figure 5:
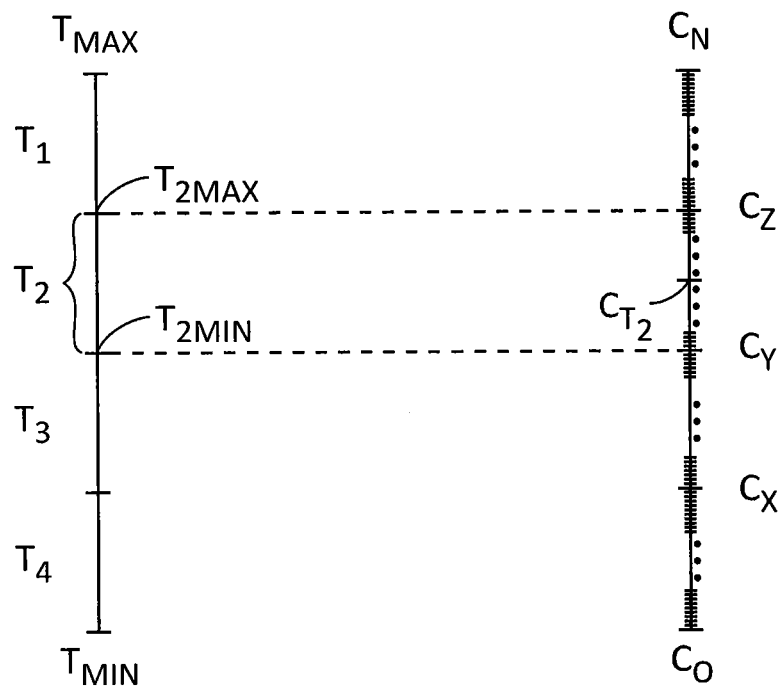
Figure 6:
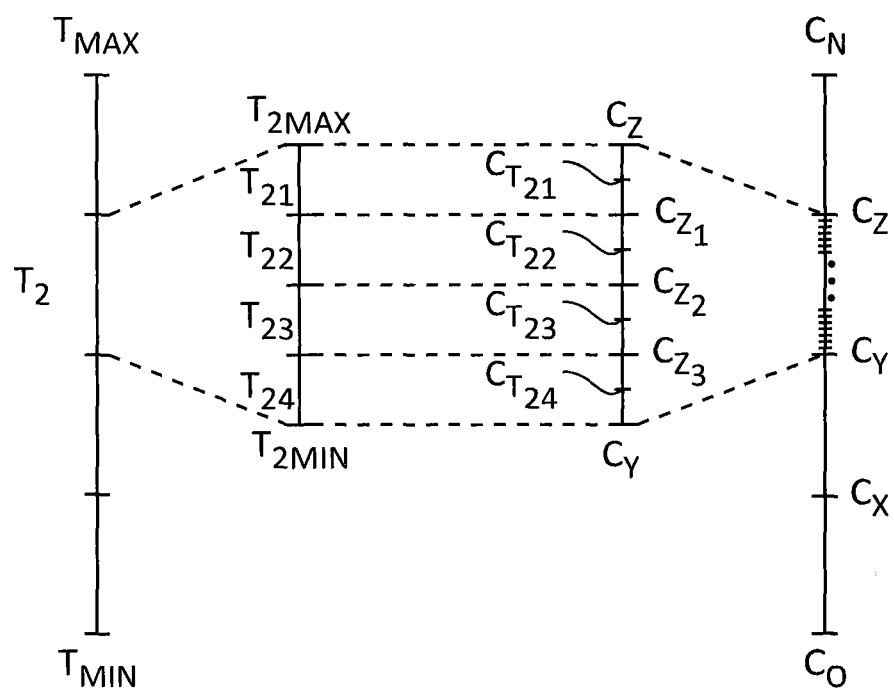

FIGS. 4 to 6 show mapping of temperature values to color or grayscale values defined according to a color model. FIGS. 4 to 6 further relate to embodiments of the invention involving isotherm mapping and/or selection of temperature ranges. The selection of temperature ranges may be automatic, based on predefined settings of the thermal imaging device; or based on a received input. The received input may in turn be a selection of the following: user input obtained by a user interacting with an input device 117, 217; and/or data values or parameters from one or more external units, for example an external unit 230, via the communications interface 116. In other words, automatic and/or user selected ranging of temperatures that are mapped to color and/or grayscale values is enabled, wherein the mapping is performed according to a selected palette.

In some embodiments a user selected, or application specific, palette is very useful as a user of a thermal imaging device 110 is typically interested in investigating a certain issue in a certain environment. All information present in the generated visual representation of the observed real world scene that does not help the user in investigating the current issue is noise to the user. Therefore, a fixed or at least semi-fixed and consistent mapping between color and/or grayscale representations to temperatures that are of interest to the user helps the interpretability of the generated visual representations, or IR images, greatly. Furthermore, the enhanced contrast achieved according to embodiments presented herein improves the interpretability and usability even further.

In FIG. 4, scalability in temperature representations is shown. This is advantageous compared to previous methods wherein levels and ranges for temperatures must typically be manually set by a user during operation of the thermal imaging device.

As illustrated in the example of FIG. 4, a thermal imaging device is configured to accept, perform calculations on, and visually represent all temperatures within a temperature span from the temperature value $T_{MIN}$ to the temperature value $T_{MAX}$. However, all temperatures that the thermal imaging device 110 is configured to process are not always present in the captured IR data values representing the observed real world scene. By way of example only, the thermal imaging device 110 may be configured to process temperatures within the interval of −40 and +200 degrees Celsius, or between −100 and +500 degrees Celsius, or any other suitable temperature span depending on the context in which the thermal imaging device is to be used in, and depending on the properties of the IR detector 1132, while the observed real world scene at a time instance during operation of the thermal imaging device 110 only comprises temperatures between for instance 2 and 15 degrees Celsius, for example, for a use case example of a refrigerator wherein the content of the refrigerator has differing temperatures.

According to embodiments, the processor 112, 212 is configured to determine the minimum and maximum of the temperatures associated with the captured IR data values. In this example, the processor 112, 212 determines that the IR data values captured at a time instance have a maximum value $T_{3MAX}$ and the minimum value $T_{3MIN}$, or in other words are comprised within the interval $T_3$. Therefore, $T_3$ is set as the temperature span representing the content of the captured IR data values that will be mapped to color or grayscale values as, as further described in connection with FIGS. 5 and 6. In an embodiment, a user selects a reduced span of temperatures that are of particular interest, using an input device 117, for example in order to detect food in a refrigerator that is at risk of going bad since the temperature of the surroundings is not low enough. Another possible food inspection application would be to monitor a buffet with warm food, where the temperature is not allowed to drop below a certain temperature threshold value. An example of a temperature span for the fridge inspection application could for instance be from 0 to 5 degrees Celsius, wherein 5 degrees Celsius could indicate the highest allowed temperature for cold holding of food and the span from 0 to 5 degrees Celsius is a risk span worth noticing as it borders on temperatures that would lead to food going bad. In the illustrative example in FIG. 6, the temperature $T_{33MAX}$ may have the value 5 degrees Celsius and $T_{33MIN}$ may have the value 0 degrees Celsius, whereby $T_{33}$ is set as the temperature span representing the content of the captured IR data values that will be mapped to color or grayscale values as, as further described in connection with FIGS. 5 and 6. As can be seen in FIG. 4, the selection of a reduced temperature span within the available amount of temperature values that the thermal imaging device is configured to process, is a scaling of the temperature span, as the number of levels into which the selected temperature is divided remain the same ($T_1$-$T_4$, $T_{31}$-$T_{34}$, and so on) even though the difference between the values of the maximum temperature and the minimum temperatures is changed, in this case reduced in two step ($T_{MIN}$-$T_{MAX}$, $T_{3MIN}$-$T_{3MAX}$, $T_{33MIN}$-$T_{33MAX}$). In embodiments presented in connection to FIGS. 5 and 6, this leads to a two-step increasing of the resolution in colors or grayscale values mapped to the temperatures associated with the captured IR data values.

The skilled person realizes that the temperature spans given herein are examples that may vary largely depending on, on the one hand, the configuration of the thermal imaging device 110 and, on the other hand, the properties related to the real world scene that is being investigated. The inspection temperature limits could be varied and may for example be determined based on standards of a certain country where the user of the thermal imaging device 110 is working.

FIGS. 5 and 6 illustrate scalability in both temperature representation, on the one hand, and color and/or grayscale values associated with the temperature values on the other hand. This is advantageous compared to previous methods wherein levels and ranges for colors, grayscale values and/or temperatures must typically be manually set by a user during operation of the thermal imaging device.

Method embodiments of the invention comprise determining the minimum temperature value and the maximum temperature value of the temperature values associated with the total temperature range of the temperature values associated with all captured IR data values in a frame.

In the example of FIGS. 5 to 6, the determined total range of temperature values of the frame, determined, e.g., by way of the processor 112, 212, lies within a subset range $T_2$ and is shown in the figures as a bar reaching from $T_{2MIN}$ to $T_{2MAX}$. The total temperature range may be divided into subsets of consecutive ranges. In FIGS. 4 to 6 this is illustrated as four consecutive ranges $T_1$ to $T_4$. The number of subsets may of course be any suitable number and may be predefined dependent on either settings of the thermal imaging device, for example set at manufacturing or calibration of the camera, or set by the user performing manual input using the input device 117. Method embodiments further comprise, for each of the subsets of consecutive ranges, selecting a subset of associated representation values in a color model, comprising color values and/or grayscale values defined by the color model. In FIGS. 5 and 6 this is illustrated in relation to the determined subset temperature range $T_2$. As is shown in FIGS. 5 and 6, the temperature range, or span, $T_2$ is associated with a corresponding range of color and/or grayscale values $C_Z$ to $C_Y$ that are in turn a subset of the range of available color and/or grayscale values $C_0$ to $C_N$ that the thermal imaging device is configured to reproduce. The amount of color and/or grayscale values that the thermal imaging device 110 is configured to reproduce are illustrated in the FIGS. 5 and 6 by markings on the bar reaching from $C_0$ to $C_N$ and dots indicating that there are more values in between the ones indicated by the markings.

The color and/or grayscale values may as described herein be defined according to any suitable color model known in the art.

Method embodiments further comprise generating an intermediate palette, for the new defined level in the scalable palette, wherein the intermediate palette represents the relation between the defined number of intermediate temperature ranges and intermediate color and/or grayscale representation values, represented in the color model, that are associated with the intermediate temperature ranges. As illustrated in FIG. 6, an intermediate temperature range corresponding to the subset temperature range $T_2$ is generated, ranging from $T_{2MIN}$ to $T_{2MAX}$. Within the intermediate temperature range, new subset temperature ranges $T_{21}$ to $T_{24}$ are defined. Correspondingly, an intermediate color and/or grayscale representation values ranging from $C_Z$ to $C_Y$ are defined for the intermediate palette. Within the intermediate color and/or grayscale value range, new color and/or grayscale values $C_{Z1}$ to $C_{Z3}$ are defined as corresponding to the minimum and maximum temperature values of the respective new subset temperature ranges $T_{21}$ to $T_{24}$. The connection between the temperature intervals and color/grayscale values in FIGS. 4 to 6 is illustrated with dotted lines.

The method embodiments may further comprise generating a visual representation of the IR data values by applying said intermediate color palette to each pixel of the frame of IR data values, thereby assigning each pixel of the frame of IR data values a representation value from the color model based on the associated temperature value of the pixel. The resulting visual representation is commonly known as an IR image and may be stored in any suitable file format known in the art, for later viewing, processing and analysis. According to the embodiment of FIG. 5, the temperature range $T_2$ will be mapped to a color or grayscale value $C_{T2}$ which is a value comprised in the range $C_Z$ to $C_Y$. In other words, all pixels, in the frame in question, that have IR data values associated with temperatures from $T_{2MIN}$ to $T_{2MAX}$ will be assigned the value $C_{T2}$. Correspondingly, all temperature ranges between $T_{MIN}$ to $T_{MAX}$ will be assigned a value of the corresponding range of color and/or grayscale values. The value within each range of color and/or grayscale values that is assigned to the temperature range may be preset according to the definition of a preset palette. Alternatively it may be selected based on any criterion that is applicable during circumstances, for example by assigning a median/middle value of the range, making a selection based on settings of the camera, or making a selection in response to a user input.

When using the scalable aspects of the palette, as illustrated in FIG. 6, each subset temperature range, here illustrated by $T_2$, is as described above divided into new subset temperature ranges, here $T_{21}$ to $T_{24}$, which will in turn be associated with corresponding color and/or grayscale ranges: $C_Z$ to $C_{Z1}$; $C_{Z1}$ to $C_{Z2}$; $C_{Z2}$ to $C_{Z3}$; and $C_{Z3}$ to $C_Y$ as shown in FIG. 6. These ranges are retrieved from the values available in range $C_Y$ to $C_Z$ and divided into the new subdivisions of FIG. 6. Method embodiments of the invention comprise setting the color and/or grayscale values $C_{T21}$ to $C_{T24}$ dependent on the value $C_{T2}$. In an embodiment, the processor 112, 212 is configured to set the color and/or grayscale values $C_{T21}$ to $C_{T24}$ dependent on the value $C_{T2}$. According to the embodiment of FIG. 6, all temperature values within a temperature ranges $T_{21}$ to $T_{24}$ will be mapped to the respective corresponding values $C_{T21}$ to $C_{T24}$. The values $C_{T21}$ to $C_{T24}$ are, according to embodiments, values that substantially resemble the value $C_{T2}$, for example nuances of a blue color, wherein, e.g., the intensity and/or saturation of the value is varied, if $C_{T2}$ represents a blue color value. In other embodiments, also the hue of the value $C_{T2}$ is varied in order to reach the new values $C_{T21}$ to $C_{T24}$.

The processor 112 may further be configured to receive the control signal from an input device 117, in response to for example manual input performed by a user using the input device 117, and to select a temperature span that is a subset of the available temperature range, based on the control signal. The control signal may indicate input values for minimum temperature and maximum temperature, or indicate an area of interest within an IR image presented to the user on a display device 118, 218, in which case the processor 112, 212 is further configured to determine the temperature values associated with the IR data values of the area of interest and identify the maximum temperature value and the minimum temperature value of the area of interest. The processor 112, 212 may alternatively be configured to receive a control signal in response to a frame being captured, and further determine the temperature values associated with the IR data values of the captured frame and identify the maximum temperature value and the minimum temperature value of the frame.

Contrast Enhancement

It should be noted that the color and/or grayscale values assigned to the respective consecutive temperature ranges according to any level of the scalable palette does not need to be consecutive color and/or grayscale values, in the meaning that they do not have to be visually represented as having a gradual transition from $C_0$ to $C_N$. In fact, according to embodiments of the invention, the color and/or grayscale values are selected to have a large visual contrast, so that they will be easily distinguishable to a user observing the resulting generated visual representation, or IR image. By the user being able to distinguish the colors and/or grayscale values presented in the generated IR image, and possibly also knowing what the different colors represent, as the user is according to some embodiments described herein enabled to select the color and/or grayscale values using an input device 117, the user is enabled an intuitive interpretation of the IR image and thereby of the depicted real world scene. For instance, a user may select color values that have an intuitive meaning to the user (hot, cold, warning, risk, normal, etc.), whereby the interpretation of the resulting IR images is easier for the particular user. In some embodiments, the user is enabled to adjust the settings of the visual representation of IR image frames by using one or more input device described herein.

All embodiments presented herein may be further improved by further increasing of contrast, and thereby visibility and interpretability, between color and/or grayscale values in the resulting IR image.

According to an embodiment, a low number of color and/or grayscale values are used to represent the defined temperature ranges, e.g., 5, 10, 20, 30, 40, 50, or any other number that is found to be suitable in order to obtain a clear visual contrast between the different color and/or grayscale values used. The values may further be selected or set such that they are color and/or grayscale values that are as visually distinguishable to the human eye as possible, based on knowledge of how the human perception works. In an embodiment, selection of color and/or grayscale values that are visually distinguishable is performed before use of the camera and included in the settings of the thermal imaging device 110 during manufacturing or calibration, e.g., by storing information in a memory device 115, 215. In an embodiment, the processor 112, 212 is configured to retrieve or receive from the memory 115, 215 information on color and/or grayscale values that are visually distinguishable and to select color and/or grayscale values to associate with temperature values when creating any level of the scalable palette. This selection, or pre-setting, of visually different color and/or grayscale values solves the problem of obtaining a low-contrast image when assigning fixed unique colors to each temperature within a selected or measured temperature span or interval. Fixed mapping of colors or grayscale values to specific temperatures or temperature intervals may also be referred to as isotherm mapping. The use of a reduced number of color and/or grayscale values representing the limited number of temperature spans in itself provides good contrast, as long as the color and/or grayscale values are selected or set such that they are clearly distinguishable by the human eye.

In combination with the color and/or grayscale value selection presented above, or as an alternative manner of achieving greater contrast between the color and/or grayscale values of the palette, embodiments of the invention comprise increasing the contrast between the neighboring color and/or grayscale values of the palette through filtering. In the context of the present disclosure, the term filtering may be interpreted as any kind of manipulation or modification of the palette or the resulting representation.

For example, filtering of the palette according to embodiments of the disclosure may be achieved by applying a separate grayscale mapping as discussed above in connection with method 300 of FIG. 3. Examples of embodiments wherein such filtering is used for increasing the contrast between the neighboring color and/or grayscale values of a palette are shown in FIGS. 8, 9, 12A-B, and 13A-B.

FIG. 12A shows an example of visual representation 1210 of an IR image obtained using embodiments of the present disclosure and FIG. 12B shows an exemplary visual representation of a palette 1220 used for generating the visual representation of the IR image as shown in FIG. 12A.

In embodiments illustrated by FIG. 12A, a visual representation 1210 of an IR image frame is obtained by assigning pixel values to at least a portion of the pixels of the IR image frame through mapping using a palette 1220. The contrast between consecutive, or neighboring, color and/or grayscale values in the palette 1220 is increased through filtering, in the example of FIG. 12 by applying a periodic function, filter or pattern to the grayscale-representing components of the palette. This is illustrated by the parameter $V_{RANGE}$, indicating that the applied grayscale information is varied, according to the selected function, filter or pattern, over the entire palette range of color and/or grayscale values.

Compared with the example visual representation 1110 obtained without such filtering of the palette (e.g., without separately mapping the grayscale-representing component of the palette independent of the color-representing components) in FIG. 11A, the example visual representation 1210 obtained according to embodiments of the disclosure has significantly enhanced contrast and feature visibility, since neighboring pixels associated with temperature values that are very similar (small differences in temperature) have large differences in their grayscale-representing components due to an independent mapping of temperatures to grayscale-representing components. Thus, the objects in the depicted scene are easily recognizable and the temperature distribution is more readily interpretable to a user viewing the example visual representation 1210 according to embodiments of the disclosure compared with the example visual representation 1110 without filtering.

Figure 13A:
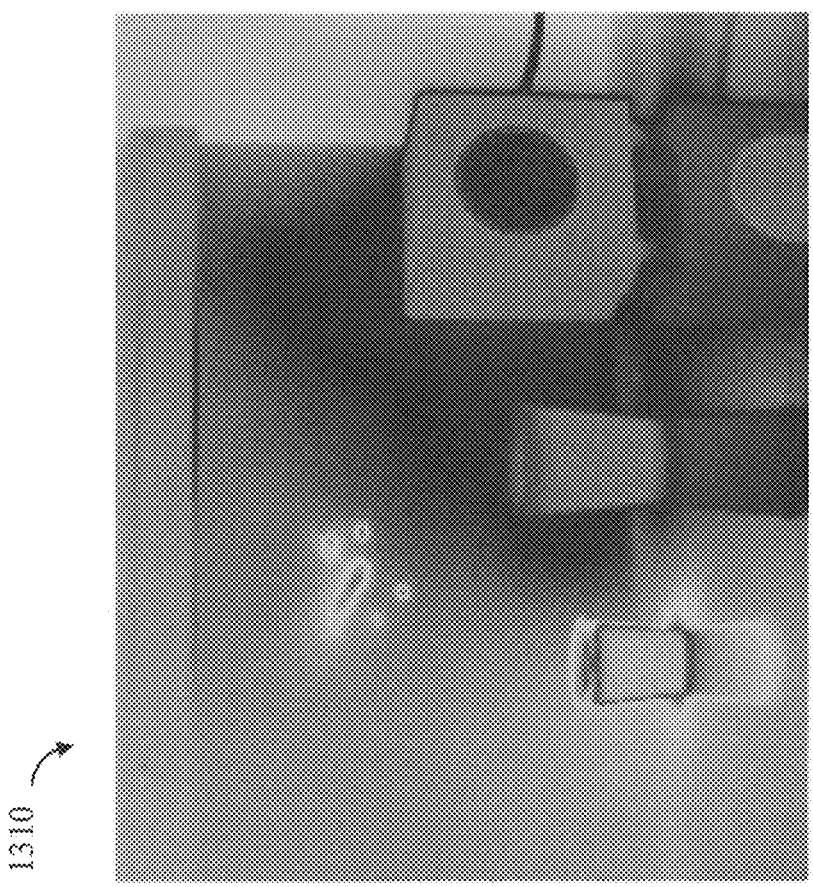
FIG. 13A shows an example of visual representation of an IR image obtained using embodiments of the disclosure.
Figure 13B:
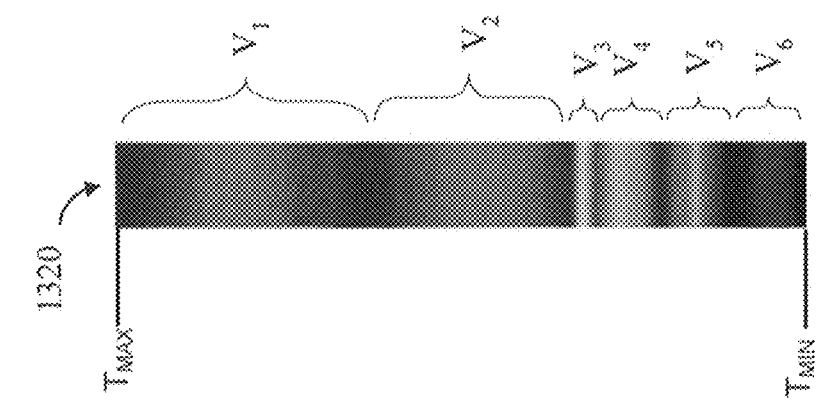
FIG. 13B shows an exemplary visual representation of a palette used for generating the visual representation of the IR image as shown in FIG. 13A according to embodiments of the disclosure.

FIG. 13A shows an example of visual representation 1310 of an IR image obtained using embodiments of the present disclosure and FIG. 13B shows an exemplary visual representation of a palette 1320 used for generating the visual representation of the IR image as shown in FIG. 13A. In embodiments illustrated by FIG. 13A, a visual representation 1310 of an IR image frame is obtained by assigning pixel values to at least a portion of the pixels of the IR image frame through mapping using the palette 1320. The contrast between consecutive, or neighboring, color and/or grayscale values in the palette 1320 is increased through filtering, in the example of FIGS. 13A and 13B by applying different functions, filters, or patterns for each of a number of sub-ranges of the palette range, in the figure illustrated by the ranges $V_1$-$V_6$, indicating that the applied grayscale information is varied, according to the selected function, filter or pattern, over each of the sub-ranges $V_1$-$V_6$. As seen from the palette 1320, each sub-range is processed by application a function, filter or pattern that in the illustrated example comprises grayscale variations from a maximum value (or minimum value depending on how the grayscale values are defined), continuously changing via a minimum (or maximum) value back to a maximum (or minimum) value, such as a sinusoidal wave or a saw-tooth pattern. For example, each of the sub-ranges $V_1$-$V_6$ may be applied a periodic function having a different period or other different parameters. In the example of the palette 1320, this grayscale variation is applied for a number of selected colors, which defined the sub-ranges.

The number of selected sub-ranges may of course be varied, i.e. one or more sub-ranges may be used. In the figure, the sub-ranges together span the entire range of the palette, but this is optional. In some embodiments, like the one illustrated by the palette 1320, the sub-ranges span different sized portions of the entire range. In other embodiments, the sub-ranges may be equal in size.

Similar to the visual representation 1210, a the visual representation 1310 shown obtained according to embodiments of the disclosure has significantly enhanced contrast and feature visibility, since neighboring pixels associated with temperature values that are very similar (small differences in temperature) have large differences in their grayscale-representing components due to mapping to the processed palette 1320. Thus, the objects in the depicted scene are easily recognizable and the temperature distribution is more readily interpretable to a user viewing the visual representation 1310 compared with the example visual representation 1110 without filtering. Further, compared with the visual representation 1210, the visual representation 1310 that has different filters applied to different sub-ranges may exhibit smoother transitions between different temperatures.

The resulting palette, after processing according to any of the embodiments described herein, may be used for assigning pixel values in step 330 of the method illustrated in FIG. 3.

Such a contrast enhancement may be performed on any or all of the levels in the scalable palette. In the example of FIGS. 5 and 6 this would mean any or all of the ranges $C_O$ to $C_N$; $C_N$ to $C_Z$; $C_Z$ to $C_Y$; $C_Y$ to $C_X$; $C_X$ to $C_O$; $C_Z$ to $C_{Z1}$; $C_{Z1}$ to $C_{Z2}$; $C_{Z2}$ to $C_{Z3}$; $C_{Z3}$ to $C_Y$; and so on. According to an embodiment, the processor 112, 212 is configured to process a range of color and/or grayscale values to enhance the contrast of neighboring values through filtering, or in other embodiments to filter the color and/or grayscale values in a certain range to enhance the contrast of, or difference between, neighboring values. According to embodiments, filters used for such processing may include grayscale variations processed using a sine-wave (e.g., also referred to as sine wave) or a saw-teeth (e.g., also referred to as tooth or saw-tooth) pattern. By applying a sine-wave or a saw-teeth pattern to grayscale variations, grayscale variations with large differences in value between neighboring values is achieved, in other words grayscale variations with large contrast between neighboring values. By applying these filters (e.g., by multiplication or addition) to a range of color and/or grayscale values, the difference, or contrast, between neighboring values in the range is enhanced. In other words, by applying such processed grayscale values to the range of color and/or grayscale values comprised in a palette, the contrast between consecutive/neighboring color and/or grayscale values in the palette, being associated with corresponding consecutive temperature values, is increased. Examples of this effect are illustrated in the palettes 800, 1220 and 1320 of the attached figures.

Of course, the frequency and the amplitude of the sine-wave or saw-teeth pattern may be adjusted such that an optimized contrast enhancement is achieved.

As is apparent to a person skilled in the art, any other function, including but not limited to any type of periodic variation, may be used instead of the sine wave or saw-tooth pattern, thereby obtaining similar advantageous effects.

In embodiments, grayscale variations may be processed using periodic variations that are periodically distributed with regard to the color and/or grayscale values comprised in the palette.

In other embodiments, grayscale variations may be processed using periodic variations that periodically distributed with regard to the temperature values comprised in a palette.

In embodiments, grayscale variations may be processed using periodic or recurring variations in gray scale for each selected temperature range in the palette. In embodiments, grayscale variations may be processed using periodic or recurring variations in gray scale for each selected color/grey scale range in the palette.

Figure 8:
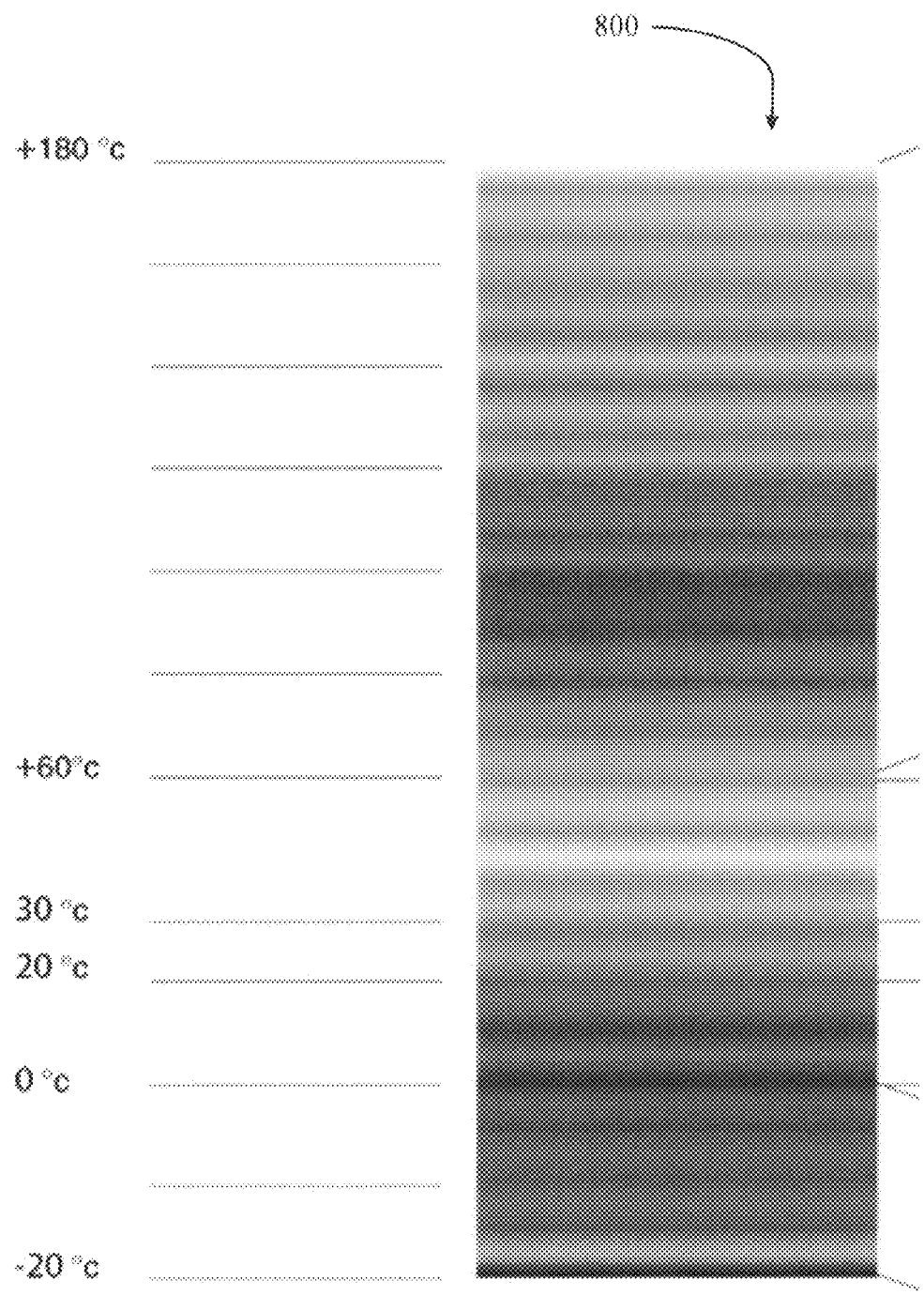
FIG. 8 shows a palette according to an embodiment of the disclosure.
Figure 9:
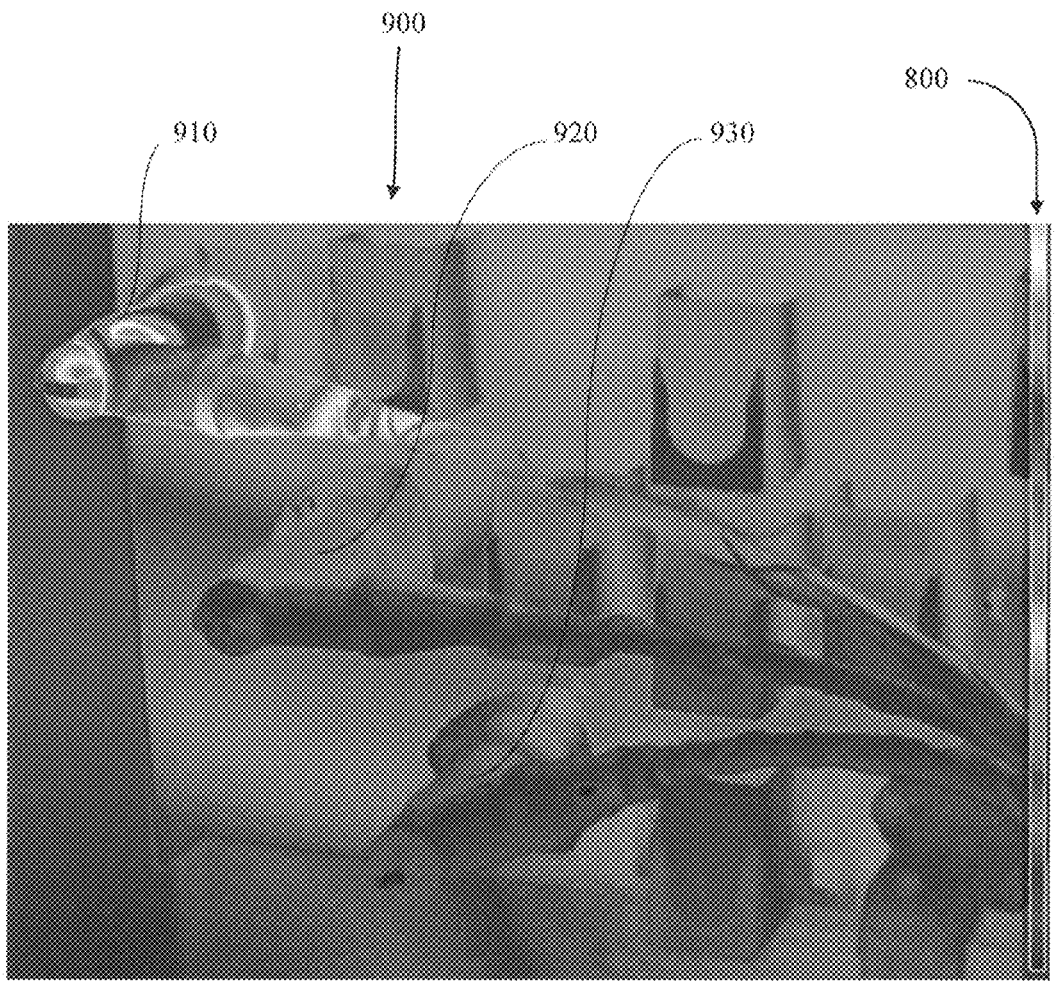
FIG. 9 shows an IR image colored using the palette of FIG. 8 according to an embodiment of the disclosure.

An example of a palette 800 having fixed mapping of color values to specific temperatures, and further being filtered to enhance the contrast of, or difference between, neighboring values, is shown in FIG. 8. FIG. 9 shows an IR image 900 colored using the palette 800 of FIG. 8. As can be seen in FIG. 9, different temperature values represented in the image are clearly distinguishable. The IR image is easily interpretable for a user inspecting the real world scene in the search of malfunctioning electronic components, as it is clear that the top component 910 has a much higher temperature than the two lower components 920, 930, thereby indicating that the top component 910 is malfunctioning. The differing temperatures of different parts of the top component 910 are further evident from the visual representation (IR image). In other words, the difference in color value mapped to two different temperature values is easily distinguishable to the human eye, even if the difference between the temperature values is small. This can be seen from looking at the different color areas of the top component 910 in FIG. 9, and also from the distribution of color values of the palette 800 (also referred to as the mapping of colors/grayscale values to temperature values) illustrated in FIGS. 8 and 9. In an embodiment, the processor 112, 212 is configured to optimize the filter to achieve an optimized contrast enhancement. Such a filter is especially advantageous when applied to a lower level of the scalable palette, after a subset of temperatures and corresponding color and/or grayscale values have been selected, as neighboring color and/or grayscale values (e.g., represented in FIG. 6 as $C_{T21}$ to $C_{T24}$) will be relatively visually similar before filtering, as they are derived from, or variations of, the same base value $C_{T2}$.

Another embodiment that provides enhanced contrast, and that may be used alone or in combination with any of the contrast enhancement methods described above, is the combination of the generated IR image with a grayscale IR and/or VL image of the observed real world scene, wherein the generated IR image is semitransparent allowing the underlying VL and/or IR image to add visible contrast and edges to the combined image. Thereby, an IR image having the colors of a specified palette and contrast information from underlying grayscale information is obtained. A grayscale IR image is in this case a grayscale representation of temperature distribution associated with the IR radiation emitted from the observed real world scene, and received by the thermal imaging device. A grayscale VL image is in this case a grayscale representation of the VL emitted from the observed real world scene and received by the thermal imaging device.

In an embodiment, the underlying grayscale image is a grayscale IR image captured using the IR imaging system 113 of the thermal imaging device 110. In another embodiment, the underlying grayscale image is a VL image captured using the VL imaging system 114 of the thermal imaging device 110. In an embodiment, the underlying grayscale image is a combined grayscale IR and grayscale VL image, captured using the respective IR and VL imaging systems 113 and 114, wherein the combined IR/VL image comprises image data from both the captured IR image and the captured VL image. The capturing of images using the IR imaging system and the VL imaging system respectively is in manners known in the art. In embodiments, the processor 112, 212 is configured to receive an IR image from the IR imaging system 113 and a VL image from the VL imaging system 114, and further to generate a combined IR/VL image by selecting image data from the IR image according to a first selection rule and VL image data from the VL image according to a second selection rule and to combine the selected IR image data and the selected VL image data into the new generated combined IR/VL image. The first and second selection rules may be preset. The first and second selection rules may comprise temperature threshold values or temperature intervals indicating which parts of the IR image that should be selected for generation of the combined image. The first and second selection rules may alternatively be user selected, according to any suitable user selection criteria such as indication of an object or area of interest in the observed real world scene, and input to the thermal imaging device 110 using an input device 117.

In an embodiment, the processor 112, 212 is, after capturing of the grayscale IR image, capturing of the grayscale VL image, or capturing of the grayscale IR and grayscale VL images and combining of the IR and VL images into a combined grayscale IR/VL image, configured to combine a semitransparent version of the generated visual representation of IR data values, to the grayscale IR image, grayscale VL image, or combined grayscale VL/IR image, thereby generating a new visual representation of IR data values with enhanced contrast (e.g., greater contrast than the previously generated visual representation).

In an embodiment, the combination is achieved through alpha-blending.

In some embodiments presented herein the combination is achieved by combining, for each pixel in at least a portion of an IR image frame, color-representing pixel value components, obtained through mapping to a fixed relations palette, with grayscale-representing pixel value components. In embodiments, the grayscale-representing pixel value components may be obtained e.g. by mapping to a different fixed relations palette or dynamically based on the temperature value associated with the IR data value of the pixel in relation to the range of temperature values associated with the IR data values of all pixels in the current frame of infrared (IR) data values.

Optionally, the method embodiments further comprise presenting the generated visual representation on a display device.

Use Case Embodiments

In an exemplifying use case embodiment, a user of a handheld thermal imaging device 110 aims said device 110 at a real world scene, for instance with the purpose of inspecting fire hazards areas for smoke divers. In this case, specific colors may be administered as alarms for ease of use and heightened safety for the smoke divers, and the smoke divers are thus enabled to inspect and collect data from a safe distance from, e.g., a fire outbreak. In such embodiments, the use of fixed mapping from temperature values, temperature thresholds, or temperature intervals to color and/or grayscale representation in the visual representation is beneficial as the smoke diver can quickly interpret areas in the observed real world scene as safe or dangerous based on the recognizable color or grayscale value mapped to the area. Using the contrast enhancement of any of the methods described herein, the interpretability of the visual representation is further enhanced.

According to other use cases, the user may be: inspecting a malfunction of an electrical component leading to overheating of the component is suspected, e.g., overheating of a fuse in a fuse box; performing food inspection in order to establish whether there is a risk of food going bad due to non-optimal temperature of the surroundings in which the food is stored; performing medical attendance; performing surveillance of surfaces suspected to have insufficient isolation; or other activities. In embodiments, the threshold values or intervals indicating that a problem may be suspected may be set according to standards of the country or state in which the user is performing the inspection. In embodiments, application specific palettes that optimize the color and/or grayscale representation used for the IR images presented to the user are obtained. For example, a user is enabled to store settings in the thermal imaging device 110 and retrieve for use at a later time.

As an example, inspection of a fuse box using prior art technology typically provides a visual representation that leads a user to interpret the situation as more dangerous than it really is. This is due to the pseudo-coloring leading to the entire fuse box being represented with colors representing "hot" temperatures compared to the surroundings, as the surroundings typically have lower temperatures than the fuse box and the coloring adapts to the temperature range present in the observed scene. Since the fuse box thereby looks "hot", the user must determine the actual temperature of the fuse, fuses or entire fuse box in order to establish whether the "hot" temperatures in the visual representation are too hot and representing a danger or anomaly. The temperature may be determined for example by the user directing the thermal imaging device onto the object of interest and using spot or area measurement functionality, provided in the thermal imaging device and well known in the art. By the use of isotherm mapping or fixed mapping between temperature and color and/or grayscale values, the interpretation is made easier, as a certain temperature value or temperature interval, e.g., a temperature value representing a threshold for when a fuse is overheated, is always represented using the same color or grayscale value. Thereby, the user immediately recognizes a risk area in the image by recognizing the color or grayscale value. Furthermore, in method embodiments described herein the contrast between color and/or grayscale values used in the visual representation may be enhanced accordingly. This is further described in connection with the attached FIGS. 8-13.

While aiming the thermal, or IR, imaging device 110 at the observed real world scene, the user is typically presented with an image of the target scene on a display 118, 218 integrated in or coupled to the thermal imaging device, or IR, imaging device. If the imaging device is a video imaging device, the image presentation will be updated every frame, in real time or near real time.

In an alternative exemplifying use case of an embodiment, a thermal, or IR, imaging device is mounted at a fixed location with the purpose of monitoring an imaged scene over time, by capturing still pictures of the imaged scene at predetermined time intervals, or by capturing a continuous image frame sequence such as a video sequence of the imaged scene. The fixedly mounted thermal, or IR, imaging device may be coupled to a memory 115 for storing the captured image frames or image frames sequence for later viewing and analysis by a user, and/or coupled to a display or presentation device for real-time or near real-time presentation of the captured image frames or image frame sequence to an user.

The visual representation of the IR data values achieved after the mapping may further be presented on a display, i.e., showing grayscale and/or color representations of the assigned pixel values as a visual image on the display, thereby enabling a user observing the display to interpret the result.

The captured IR image may be displayed to an intended user based on the captured IR image comprising IR data values, a predefined palette representing a finite set of grayscale and/or color values of a color model displayable on a display, and a predetermined relation describing a mapping from IR data values to said predefined palette.

Figure 7:
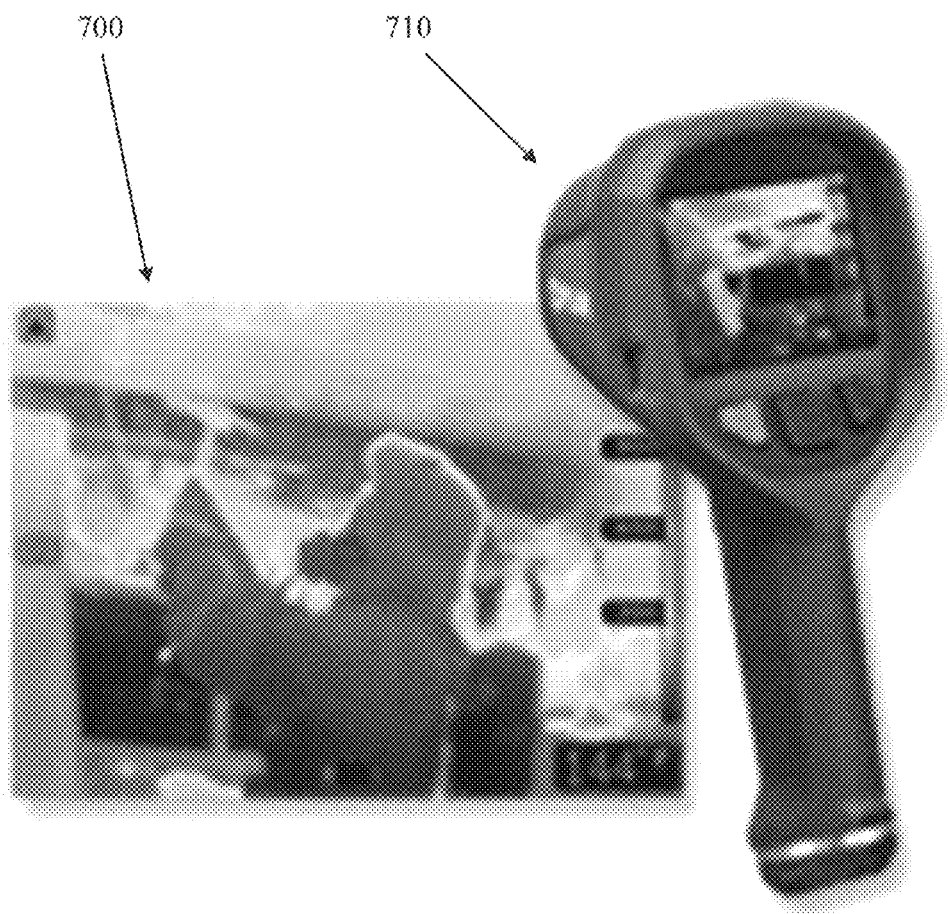
FIG. 7 shows an IR image generated according to an embodiment of the disclosure.

Specific colors may be assigned as alarms in certain temperature regions. In some embodiments, within temperature regions assigned to normal temperature values, a grayscale is shown (e.g., for the use case wherein the IR image is used to obtain "night vision"). Hence, the thermal imaging device 110 may combine an automatic grayscale palette with solid colorization of isotherms, wherein the isotherms represent a respective fixed temperature value or temperature interval. The colorization of the isotherms may be performed in a semitransparent manner, for example through overlaying, blending, or fusion of the pixel values of a grayscale IR, VL, or IR/VL image with semitransparent color and/or grayscale values associated with the isotherm temperature values and/or intervals. The semitransparent combination of pixel values may in an embodiment be performed through alpha-bending. An example of an IR image 700 comprising a combination of an automatic grayscale palette with semi-transparent isotherms is shown in FIG. 7, along with an example of a hand-held camera 710 adapted for capturing and displaying such an image. For example, in some embodiments, hand-held camera 710 may be used to implement appropriate portions of thermal imaging device 110 and/or thermal imaging system 200.

Relating to all embodiments described above, the image presented to the user, the image either being a real-time image of an observed real world scene or an image retrieved from a storage at a later time, may be a VL image captured by a VL imaging system 114 of the thermal, or IR, imaging device 110, an IR image generated according to any of the method embodiments described herein, or a combined image comprising image information from both the VL image and the generated IR image. The combination of image information may be performed through overlaying, blending, or fusing techniques known in the art.

According to an embodiment, the input device 117 comprises buttons and/or touch screen functionality coupled to a graphical user interface and the user is enabled to provide input to the thermal imaging device 110 by pressing buttons and/or use at least one finger or for example stylus in connection to the graphical user interface. The user is thereby enabled to, e.g., input application specific selection information, or in other words selections of a specific professional application scenario. For instance, the user is enabled to select and/or generate an application specific palette, which may in embodiments further be stored in a memory device 115, 215. In an embodiment, the processor 112, 212 is configured to receive input from the input device 117, possibly via the communications interface 116, and further to perform steps and functions of embodiments of the inventive method described herein, for example selection of a specific professional application scenario, selection of an application specific palette, or generation of an application specific palette based on said input. According to embodiments, the display on which the graphical user interface, and the visual representations, or IR images, is displayed is a touch sensitive display.

The generated IR image, or a combined IR/VL image as described herein, may after capturing be displayed by way of a display device 118, 218 incorporated in, connected to or communicatively coupled to the thermal imaging device used for capturing the image or images, or by way of a display device 218 in a computing device 230 such as a tablet computer, a laptop a PDA, a smartphone, a mobile phone, a cellular communications device or a desktop computer, configured to receive and display the generated IR images, in order to enable a user to analyze and interpret the result.

Further Contrast Enhancement of the Visual Representation

According to embodiments, an IR image/visual representation of IR data values obtained using, any of the methods presented herein may further be combined with high spatial frequency content of a VL image captured using such a VL imaging system, to yield a combined image generated in step 330. According to some of these embodiments, edge detection may be performed and the edges enhanced using the methods described herein, whereby enhanced contrast is achieved through the enhanced edge content being added to the generated IR image. The combination is performed through superimposition of the high spatial frequency content of the visual image and the IR image. As a result, contrasts from the visual image can be inserted into an IR image showing temperature variations, thereby combining the advantages of the two image types without losing clarity and interpretability of the resulting combined image.

According to embodiments the processor 112, 212 is configured to combine VL image data with IR image data in order to generate a combined image. The combination method performed by the processor 112, 212 may for instance comprise overlaying of image data, blending, and/or fusion. Depending on the content of the imaged scene and what kind of information a user intends to obtain from the image, different combination methods may be preferable.

The most commonly used fusion methods are known as threshold fusion and picture-in-picture fusion. In a method for performing a threshold fusion of images, a visual image and an IR image of the same scene are captured. When performing picture-in-picture fusion, a visual image and an IR image showing the same scene comprising one or more objects are captured, and the pixels inside a predetermined area, often in the form of a square, are displayed from the IR image while the rest of the combined image is shown as visual data.

The high spatial frequency content of the visual image may for example be extracted through high pass filtering or by extraction of the difference between two images depicting the same real world scene (commonly referred to as a difference image). In embodiments, to preserve the color or grayscale palette of the IR image when combining an IR image and a VL image according to any of the embodiments presented herein, only the luminance component of the filtered visual image may be added to the IR image. As a result, the colors are not altered and the properties of the original color palette are maintained, while at the same time adding the desired contrast. To maintain the palette through all stages of processing and display is beneficial, as described in embodiments relating to isotherm mapping and/or use of a scalable palette, since the relevant IR or temperature related information is kept throughout the process and the interpretation of the combined image may thereby be facilitated for the user.

When combining the luminance of the visual image with the IR image, a factor alpha can be used to determine the balance between the two images. This factor can be decided by the imaging device or imaging system itself, using suitable parameters for determining the level of contour needed from the visual image to create a good image, but can also be selected by a user for example using an input device 117, thereby giving an input to the thermal imaging device or imaging system. The thermal imaging device may be configured to receive such an input, for example via an input device 117. The factor can also be altered at a later stage, such as when visual representations, or images, are stored in the system or in a PC or the like and can be adjusted to suit any demands from the user.

If the combination method is overlaying and/or blending, the user may be enabled to control the opacity of the VL image information and/or the IR image information. If the combined image is a fused image, the user may be enabled to control the amount of relevant information, e.g., high frequency content that is retrieved from the VL image or the IR image and introduced into the combined image. According to embodiments, the processor 112, 212 is configured to receive a control signal, in response to the user using an input device 117, 217, and to set the opacity of the VL image information and/or the IR image information based on the control signal.

According to an embodiment, the combined image is presented to the user of the thermal, or IR, imaging device 110 on a display 118, 218 comprised in, or communicatively coupled to, the thermal, or IR, imaging device.

Before displaying the resulting combined image to a user, high resolution noise may in an embodiment be added to the image in order to create an impression of high resolution and increased detail and make the image more easily interpreted by the user.

Image Stabilization and Alignment

If the resulting visual representation, or IR image, is to be combined with another image, e.g., a VL image or a difference image from which additional edge information is retrieved, the images to be combined are preferably stabilized and aligned with regard to one another before combination.

Image stabilization is performed to compensate for movements of the thermal imaging device, etc. The image stabilization and alignment may be performed according to any method known in the art.

According to the embodiments wherein an IR imaging system and a visual imaging system are used to capture images of the same real world scene, the optical axes between the imaging components are typically at a distance from each other and an optical phenomenon known as parallax will arise, causing parallax related pixel displacement between the images captured with different imaging systems. To eliminate the parallax related errors, the images that are to be combined/fused/blended are preferably aligned.

Certain characteristics of IR radiation sensors cause measurement errors. Individual detector elements have unique response characteristics. These response characteristics are found to produce non-uniformities, which result in noise. Additionally heat generated internally by the thermal imaging device and the environment surrounding the thermal imaging device causes temperature drift which causes offsets in the captured IR data compared to IR data emitted from the observed real world scene. Many IR cameras have functionality to correct for such non-uniformities and temperature-drift effects and are referred to as IR temperature calibration.

For example, some IR cameras can automatically or manually perform offset compensation/calibration, which corrects for the effects mentioned above by observing a uniform IR or thermal scene, e.g., by placing a shutter between the optics and the detector elements, and measuring offset correction data for each detector element which provides the desired uniform output response and obtaining a reading of the surrounding environment, e.g., measure the ambient temperature.

These measured non-uniformities offset correction values and temperature drift offset correction values, referred to as IR temperature calibration data parameters, may be stored and later applied in subsequent IR measurements to correct for the measurement errors described above.

Combined File Format

According to an embodiment, the inventive concept comprises a file format wherein VL image data and IR image data may be stored within the same file. Optionally, the file format may be adapted to enable inclusion of additional information parameters relating to the VL image data and/or the IR image data or thermal radiometric information related to received IR radiation, time stamps representing the time of capture of the respective image data, and parameters regarding stabilization and/or alignment of image data.

According to embodiments, when a user uses specific purpose software to open a file according to the embodiment presented above, comprising VL image data, IR image data and possibly one or more additional information parameters, the user will be presented with either the VL image data, the thermal image data, or a predetermined combination of the VL and IR image data according to settings of the thermal, or IR, imaging device used to capture the images and/or settings of the specific purpose software used to open the file. Thereafter, the user is enabled to modify the view by using any of one or more interaction tools, which are graphically represented by icons or the like in a graphical user interface provided by the specific purpose software. The user is enabled to use the one or more interaction tools by using input and/or interaction functionality, comprising a selection of one or more control devices for inputting commands and/or control signals, such as an interactive display, e.g., a touch or pressure sensitive display, a joystick, a mouse, a keyboard and/or record/push-buttons.

Further Embodiments

According to an embodiment, the user can save the final combined image or any of the previous VL and/or IR images corresponding to the different method steps to the memory 115 for later viewing or for transfer to another processing unit, such as a computer, for further analysis and storage.

In an alternative embodiment, disclosed methods can be implemented by a computing device such as a PC that may encompass the functions of an FPGA-unit specially adapted for performing the steps of methods of the present disclosure, or encompass a general processor/processing unit 112/212 according to the description in connection with FIGS. 1-2. The computing device may further comprise the memory 115 and/or the display unit 218. Depending on circumstances it is possible to use the disclosed methods live, i.e., for a streamed set of images filtered and combined in real time, or near real time, for instance at 30 Hz, that can be recorded and replayed as a movie, or to use still pictures.

The processor 112 is, according to embodiments, configured to perform any or all of the method steps that are associated with processing of captured IR data values, such as selection of IR data values, mapping of temperature values associated with the IR data values to color and/or grayscale values, assigning each pixel of a frame of IR data values a representation value from a preselected color model based on the associated temperature value of said pixel, and other operations described herein.

According to embodiments, there is provided a computer-readable medium on which is stored non-transitory information for performing a method according to any of the embodiments described herein.

According to embodiments, there is provided a computer-readable medium on which is stored non-transitory information configured to control a processor/processing unit to perform any of the steps or functions of the invention described herein.

According to embodiments, there is provided a computer program product comprising code portions adapted to control a processor to perform any of the steps or functions of the invention described herein.

Software in accordance with the present disclosure, such as program code and/or data, can be stored in non-transitory form on one or more machine-readable mediums. It is also contemplated that software identified herein can be implemented using one or more general purpose or specific purpose computers and/or computer systems, networked and/or otherwise.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa. Where applicable, the ordering of various steps described herein can be changed, combined into composite steps, and/or separated into sub-steps to provide features described herein.

The foregoing disclosure is not intended to limit the present invention to the precise forms or particular fields of use disclosed. It is contemplated that various alternate embodiments and/or modifications to the present invention, whether explicitly described or implied herein, are possible in light of the disclosure. Accordingly, the scope of the invention is defined only by the claims.

We claim:

1. A method comprising:

receiving an infrared (IR) image frame comprising IR data values captured by a detector comprising a plurality of detector elements, wherein the IR image frame comprises, for each detector element, a pixel having an assigned one of the IR data values representing a temperature value associated with infrared radiation emitted from an observed scene and received by the detector element;

converting the IR image frame to a visible image frame according to a color model by:

assigning, to each pixel, (i) a color value selected from a plurality of color values corresponding to at least one color-representing component based on the IR data value of the pixel and according to a first mapping between IR data values representing temperatures and color-representing component values from a palette, each of the plurality of color values corresponding to a different IR value range, the color value selected for the pixel corresponding to a particular IR value range comprising the IR data value of the pixel, the first mapping being invariable with respect to a range of the captured IR data values in the IR image frame so as to maintain a fixed temperature-to-color mapping, and (ii) a grayscale value corresponding to a grayscale-representing component according to a second mapping based on the IR data value of the pixel with respect to other IR data values within the particular IR value range associated with the pixel, and generating, for each pixel, a visible pixel value by combining the corresponding color value and the corresponding grayscale value assigned to the pixel; and displaying the visible image frame by presenting, for each pixel in the IR image frame, the corresponding visible pixel value.

2. The method of claim 1, wherein the second mapping provides different grayscale-representing component values for at least a portion of IR data values within the particular IR value range.

3. The method of claim 2, wherein the second mapping provides the different grayscale-representing component values for at least the portion of the IR data values within the IR value range according to one or more sinusoidal wave functions or one or more saw-tooth patterns.

4. The method of claim 3, wherein the one or more sinusoidal wave functions comprise a plurality of sinusoidal wave functions each having a corresponding period.

5. The method of claim 1, wherein the grayscale value corresponding to the grayscale-representing component is assigned to the pixel according to the second mapping further based on the IR data value relative to the range of the captured IR data values in the IR image frame.

6. The method of claim 1, wherein:

the color model is a hue-saturation-value (HSV) model;
the at least one color-representing component comprises a hue component and/or a saturation component; and
the grayscale-representing component comprises a value component representing lightness.

7. The method of claim 1, further comprising receiving a control signal, wherein:

the palette comprises a predefined set of color-representing component values and grayscale-representing component values to be used in the converting of the IR image frame to the visible image frame; and the palette is selected from a predefined set of palettes based on the received control signal.

8. The method of claim 7, wherein the control signal is indicative of a type of use of the visible image frame.

9. The method of claim 1, wherein the first and the second mapping are defined as part of the palette.

10. The method of claim 1, wherein the visible image frame is converted into a representation in another color model for display.

11. A system comprising:

a focal plane array (FPA) comprising a plurality of detector elements responsive to infrared (IR) radiation emitted from an observed scene; and a processor configured to:

receive an IR image frame comprising IR data values captured by the FPA, wherein the IR image frame comprises, for each detector element of the FPA, a pixel having an assigned one of the IR data values representing a temperature value associated with the infrared radiation emitted from the observed scene and received by the FPA, convert the IR image frame to a visible image frame according to a color model by:

assigning, to each pixel, (i) a color value selected from a plurality of color values corresponding to at least one color-representing component based on the IR data value of the pixel and according to a first mapping between IR data values representing temperatures and color-representing component values from a palette, each of the plurality of color values corresponding to a different IR value range, the color value selected for the pixel corresponding to a particular IR value range comprising the IR data value of the pixel, the first mapping being invariable with respect to a range of the captured IR data values in the IR image frame so as to maintain a fixed temperature-to-color mapping, and (ii) a grayscale value corresponding to a grayscale-representing component according to a second mapping based on the IR data value of the pixel with respect to other IR data values within the particular IR value range associated with the pixel, and generating, for each pixel, a visible pixel value by combining the corresponding color value and the corresponding grayscale value assigned to the pixel, and displaying the visible image frame by presenting, for each pixel in the IR image frame, the corresponding visible pixel value.

12. The system of claim 11, wherein the second mapping provides different grayscale-representing component values for at least a portion of IR data values within the particular IR value range.

13. The system of claim 12, wherein the second mapping provides the different grayscale-representing component values for at least the portion of the IR data values within the IR value range according to one or more sinusoidal wave functions or one or more saw-tooth patterns.

14. The system of claim 13, wherein the one or more sinusoidal wave functions comprise a plurality of sinusoidal wave functions each having a corresponding period.

15. The system of claim 11, wherein the grayscale value corresponding to the grayscale-representing component is assigned to the pixel according to the second mapping further based on the IR data value of the pixel relative to the range of the captured IR data values in the IR image frame.

16. The system of claim 11, wherein:
the color model is a YCbCr model;
the at least one color-representing component comprises at least one of chroma components Cb and Cr; and
the grayscale-representing component comprises a luminance component Y representing lightness.

17. The system of claim 11, further comprising an input device configured to receive a manual user input and to send a control signal to the processor in response to the received manual user input, wherein:
the palette comprises a predefined set of color-representing component values and grayscale-representing component values to be used in the converting of the IR image frame to the visible image frame; and
the processor is further configured to select the palette from a predefined set of palettes based on the control signal.

18. The system of claim 17, wherein the control signal is indicative of a type of use of the visible image frame.

19. The system of claim 11, further comprising a display device configured to present the visible image frame, wherein the processor is further configured to convert visible image frame into a representation in a second color model associated with the display device.

20. A non-transitory machine-readable medium storing non-transitory information comprising a plurality of machine-readable instructions which, when executed by one or more processors of a system, are configured to cause the system to perform a method comprising:

receiving an infrared (IR) image frame comprising IR data values captured by a detector comprising a plurality of detector elements, wherein the IR image frame comprises, for each detector element, a pixel having an assigned one of the IR data values representing a temperature value associated with infrared radiation emitted from an observed scene and received by the detector element;
converting the IR image frame to a visible image frame according to a color model by:
assigning, to each pixel, (i) a color value selected from a plurality of color values corresponding to at least one color-representing component based on the IR data value of the pixel and according to a first mapping between IR data values representing temperatures and color-representing component values from a palette, each of the plurality of color values corresponding to a different IR value range, the color value selected for the pixel corresponding to particular IR value range comprising the IR data value of the pixel, the first mapping being invariable with respect to a range of the captured IR data values in the IR image frame so as to maintain a fixed temperature-to-color mapping, and (ii) a grayscale value corresponding to a grayscale-representing component according to a second mapping based on the IR data value of the pixel with respect to other IR data values within the particular IR value range associated with the pixel, and
generating, for each pixel, a visible pixel value by combining the corresponding color value and the corresponding grayscale value assigned for the pixel; and
displaying the visible image frame by presenting, for each pixel in the IR image frame, the corresponding visible pixel value.

* * * * *

UNITED STATES PATENT AND TRADEMARK OFFICE
CERTIFICATE OF CORRECTION

PATENT NO. : 10,298,859 B2
APPLICATION NO. : 14/531955
DATED : May 21, 2019
INVENTOR(S) : Walter Frost et al.

Page 1 of 1

It is certified that error appears in the above-identified patent and that said Letters Patent is hereby corrected as shown below:

In the Specification

In the Detailed Description:
In Column 31, Line 40, change "values obtained using, any of the methods" to --values obtained using any of the methods--

In the Claims

In Column 38, Lines 19-20, change "pixel corresponding to particular IR" to --pixel corresponding to a particular IR--

Signed and Sealed this
Twelfth Day of May, 2020

Andrei Iancu
*Director of the United States Patent and Trademark Office*